(12) United States Patent
Barringer et al.

(10) Patent No.: US 12,531,166 B2
(45) Date of Patent: Jan. 20, 2026

(54) CARBIDE-BASED FUEL ASSEMBLY FOR THERMAL PROPULSION APPLICATIONS

(71) Applicant: BWXT Nuclear Energy, Inc., Charlotte, NC (US)

(72) Inventors: Eric A. Barringer, Rustburg, VA (US); Russell R. Jensen, Lynchburg, VA (US); Jeremy L. Gustafson, Lynchburg, VA (US); Matt Ales, Puyallup, WA (US); Joshua J. Bergman, Valensole (FR); Ryan T. Swanson, Lynchburg, VA (US); Jonathan K. Witter, Forest, VA (US); Danny Galicki, Knoxville, TN (US); James B. Inman, Forest, VA (US); Matt Krecicki, Winter Park, FL (US); Roger Ridgeway, Hurt, VA (US)

(73) Assignee: BWXT Nuclear Energy, Inc., Charlotte, NC (US)

( * ) Notice: Subject to any disclaimer, the term of this patent is extended or adjusted under 35 U.S.C. 154(b) by 231 days.

(21) Appl. No.: 18/204,517

(22) Filed: Jun. 1, 2023

(65) Prior Publication Data

US 2023/0326618 A1   Oct. 12, 2023

Related U.S. Application Data

(63) Continuation of application No. 17/399,822, filed on Aug. 11, 2021, now Pat. No. 11,728,044.

(Continued)

(51) Int. Cl.
*G21D 5/02* (2006.01)
*G21C 3/07* (2006.01)
(Continued)

(52) U.S. Cl.
CPC .............. *G21D 5/02* (2013.01); *G21C 3/07* (2013.01); *G21C 3/64* (2013.01); *G21C 5/126* (2013.01);
(Continued)

(58) Field of Classification Search
CPC ... G21D 5/02; G21C 3/07; G21C 3/64; G21C 5/126; G21C 3/322; G21C 3/324;
(Continued)

(56) References Cited

U.S. PATENT DOCUMENTS

| 2,982,713 A | 5/1961 | Sankovich et al. |
| 3,383,858 A | 5/1968 | Willinski et al. |

(Continued)

FOREIGN PATENT DOCUMENTS

JP   2015-025690 A   2/2015

OTHER PUBLICATIONS

Bianchi, "Thermophysical and mechanical characterization of advanced materials for the LHC collimation system", PhD diss., INFN, Pisa, 2017, pp. 1-4. (Year: 2017).*

(Continued)

*Primary Examiner* — Jack W Keith
*Assistant Examiner* — Daniel Wasil
(74) *Attorney, Agent, or Firm* — Morgan, Lewis & Bockius LLP

(57) ABSTRACT

Carbide-based fuel assembly includes outer structural member of ceramic matrix composite material, the interior surface of which is lined in higher temperature regions with an insulation layer of porous refractory ceramic material. A continuous insulation layer extends the length of the fuel assembly or separate insulation layer sections have a thickness increasing step-wise along the length of the fuel assembly from upper (inlet) section towards bottom (outlet) section. Fuel element positioned inward of the insulation layer (Continued)

and between support meshes has a fuel composition including HALEU and the form of a plurality of individual elongated fuel bodies or one or more fuel monolith bodies containing coolant flow channels. Fuel assemblies are distributively arranged in a moderator block, with upper end of the outer structural member attached to an inlet for propellant and lower end of the outer structural member operatively interfaced with a nozzle forming a nuclear thermal propulsion reactor.

44 Claims, 9 Drawing Sheets

Related U.S. Application Data

(60) Provisional application No. 63/090,373, filed on Oct. 12, 2020.

(51) Int. Cl.
| | |
|---|---|
| *G21C 3/64* | (2006.01) |
| *G21C 5/12* | (2006.01) |
| *B64G 1/40* | (2006.01) |
| *F02K 9/42* | (2006.01) |
| *G21C 3/322* | (2006.01) |
| *G21C 3/324* | (2006.01) |
| *G21C 5/02* | (2006.01) |
| *G21C 11/08* | (2006.01) |

(52) U.S. Cl.
CPC .............. *B64G 1/408* (2013.01); *F02K 9/425* (2013.01); *G21C 3/322* (2013.01); *G21C 3/324* (2013.01); *G21C 5/02* (2013.01); *G21C 11/081* (2013.01)

(58) Field of Classification Search
CPC .......... G21C 5/02; G21C 5/12; G21C 11/081; B64G 1/408; F02K 9/425
USPC .................... 376/318, 425, 417, 437, 440
See application file for complete search history.

(56) References Cited

U.S. PATENT DOCUMENTS

| | | | |
|---|---|---|---|
| 3,677,893 | A | 7/1972 | Huebotter et al. |
| 3,817,029 | A | 6/1974 | Frisch |
| 4,220,614 | A | 9/1980 | Fleischer |
| 4,543,233 | A | 9/1985 | Grover et al. |
| 5,247,548 | A | 9/1993 | Malloy, III et al. |
| 5,410,578 | A | 4/1995 | Walton |
| H1753 | H | 10/1998 | Warren et al. |
| 6,905,644 | B1 * | 6/2005 | Muller ................... B28B 3/26 264/108 |
| 8,920,871 | B1 | 12/2014 | Youchison et al. |
| 10,068,675 | B1 | 9/2018 | Raj et al. |
| 2013/0163711 | A1 | 6/2013 | Zabiego et al. |
| 2015/0155059 | A1 | 6/2015 | Yetisir et al. |
| 2015/0155060 | A1 | 6/2015 | Yetisir et al. |
| 2015/0228363 | A1 | 8/2015 | Dewan et al. |
| 2017/0263345 | A1 | 9/2017 | Venneri et al. |
| 2021/0304909 | A1 | 9/2021 | Gramlich et al. |
| 2022/0115152 | A1 | 4/2022 | Barringer et al. |

OTHER PUBLICATIONS

Kardoulaki et al., "Synthesis, thermal conductivity, and hydrogen compatibility of a high melt point solid solution uranium carbide, (U0.2Zr0.8)C", Nuclear Materials and Energy 33 (2022) 101290.

Lanin, Chapters 2 and 4 of "Nuclear Rocket Engine Reactor," in Springer Series in Materials Science, vol. 170, Ed. Wang et al., Springer-Verlag Berlin Heidelburg (2013).

Benensky et al., "Evaluation of Novel Refractory Carbide Matrix Fuels for Nuclear Thermal Propulsion", ANS Nets 2018—Nuclear and Emerging Technologies for Space, Las Vegas, NV (2018).

Prasad et al., "Nonproliferation improvements and challenges presented by small modular reactors", Progress in Nuclear Energy 80 (2015): 102-109.

International Search Report issued on Dec. 3, 2021 in International Application No. PCT/US21/45634.

Nam et al., "Innovative Concept for an Ultra-Small Nuclear Thermal Rocket Utilizing a New MOderated Reactor", Nuclear Engineering and Technology, 47 (2015) 678-699.

Borowski et al., "Nuclear Thermal Propulsion (NTP): A Proven Growth Technology for Human NEO/Mars Exploration Missions", 2012 IEEE Aerospace Conference (Big Sky, MT), (Mar. 3, 2021), 20 pages.

Haslett, "Space Nuclear Thermal Propulsion Program Final Report", Phillips Laboratory Space and Missile Technology Directorate Technical Report PL-TR-95-1064 (May 1995), 142 pages.

Benensky, "Summary of Historical Solid Core Nuclear Thermal Propulsion Fuels", Toshiba Westinghouse Undergraduate Fellows Program, The Pennsylvania State University (Aug. 16, 2013), 37 pages.

Steck, "Liquid Metal Fast Breeder Reactor Design Study", Final Report. No. WCAP-3251-1, pp. 1-27, Westinghouse Electric Corp. Atomic Power Div, Pittsburgh, 1964. (Year: 1964).

O'Rourke, INL/EXT-17-41117, Idaho National Lab, 2017. (Year: 2017).

Gates et al., "Low-enriched cermet-based fuel options for a nuclear thermal propulsion engine", Nuclear Engineering and Design, 331 (2018) 313-330.

Yan et al., "Preparation of pore-controllable zirconium carbide ceramics with tunable mechanical strength, thermal conductivity and sound absorption coefficient", Ceramics International, 46 (2020) 19609-19616.

Wagner, "Research, Development, and Production of Substoichiometric Zirconium Carbide for High-Temperature Insulation", U.S. Atomic Energy Commission, Contract W-7405-ENG. 36, LA-5224, UC-25 and UC-80, Issued Jul. 1973.

Extended European Search Report dated Feb. 16, 2024, issued in corresponding European Patent Application No. 21880729.5.

* cited by examiner

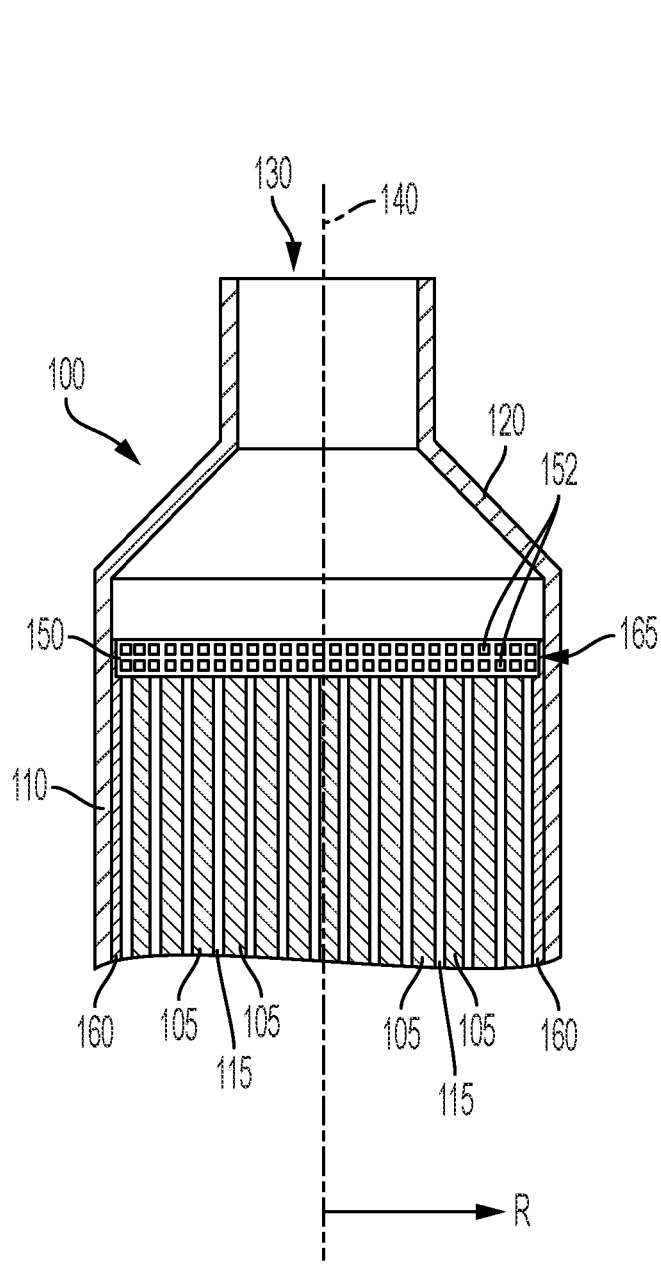
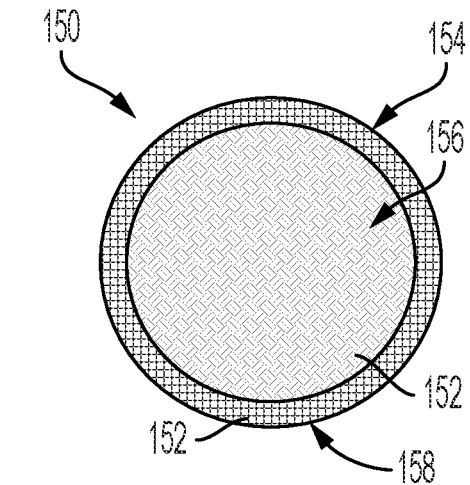
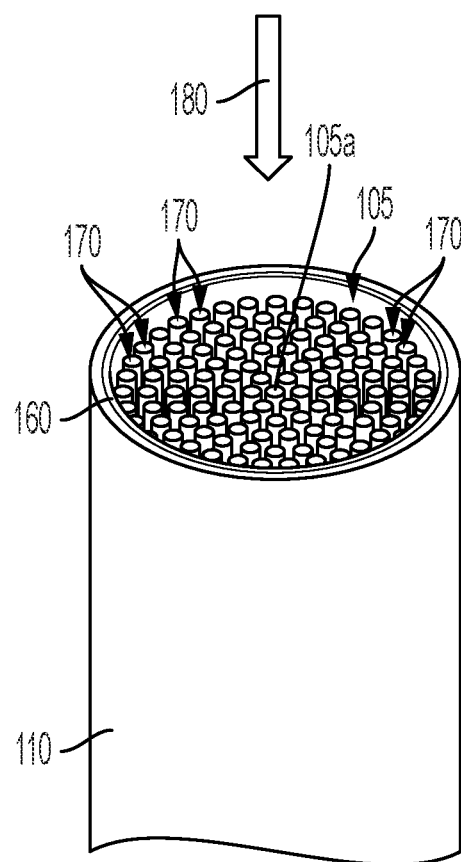
FIG. 3A
FIG. 3B
FIG. 3C

US 12,531,166 B2

CARBIDE-BASED FUEL ASSEMBLY FOR THERMAL PROPULSION APPLICATIONS

RELATED APPLICATION DATA

This application is a continuation application of U.S. patent application Ser. No. 17/399,822, filed Aug. 11, 2021, which is based on and claims priority under 35 U.S.C. § 119 to U.S. Provisional Application No. 63/090,373, filed Oct. 12, 2020, the entire contents of which are incorporated herein by reference.

STATEMENT REGARDING FEDERALLY SPONSORED RESEARCH OR DEVELOPMENT

The invention described herein was made in the performance of work under Subcontract 00212687 to DOE Award No. DE-AC07-05ID14517 and NASA Prime Contract 80MSFC17C0006, and is subject to the provisions of section 2035 of the National Aeronautics and Space Act (51 U.S.C. § 20135). The Government has certain rights in this invention.

TECHNICAL FIELD AND INDUSTRIAL APPLICABILITY

The present disclosure relates generally to nuclear fission reactors and structures related to nuclear fission reactors, in particular for propulsion. Such nuclear propulsion fission reactors may be used in various non-terrestrial applications, such as space and ocean environments. In particular, the disclosure relates to a carbide-based fuel assembly that can be incorporated into a nuclear reactor for nuclear thermal propulsion and which is capable of heating hydrogen propellant to temperatures required to achieve specific impulse ($I_{sp}$) values in the range of 900 to 1000 seconds, alternatively 950 to 1000 seconds. The fuel assembly includes uranium-bearing fuel elements, preferably using high-assay low-enriched uranium (HALEU), and a carbide-based insulator and other structural material.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Various propulsion systems for non-terrestrial applications, such as in space, have been developed. A typical design for a nuclear thermal propulsion (NTP) reactor and engine 10 is shown in FIG. 1. The illustrated nuclear thermal propulsion reactor and engine 10 includes four main features: a vessel 20 having a reactor 22 contained within a reflector 24, turbomachinery 30 including turbo pumps 32 and other piping and support equipment 34, shielding 40 (which is shown as internal shielding in between the turbomachinery 30 and the vessel 20, but can also be external shielding), and a nozzle section 50 including a nozzle 52 and a nozzle skirt 54.

Various fuel element structural and fuel materials have been considered. Typically, prior nuclear rocket programs utilized high-enriched (weapons grade) uranium (HEU), enriched to around 90% U-235. In one example, coated uranium carbide particles or uranium carbide-zirconium carbide particles were dispersed in a graphite matrix that was coated with zirconium carbide or niobium carbide to prevent hydrogen erosion of the graphite. A hydrogen propellant/coolant temperature of 2550K was reached during integrated nuclear engine testing. In another example, a cermet fuel consisting of uranium oxide embedded in a refractory metal matrix was used.

Structural forms for NTP reactors have, in one example, included particle bed reactors (PBR), in which the hydrogen propellant flowed radially through a bed of coated $UC_x$ fuel particles and then axially outward from the center of the fuel element into the nozzle chamber, and in a second example, included propellant/coolant flowing axially over bundles of fuel rods.

Despite the state of the art for NTP reactors, there remains a need for improved designs, and particularly designs that incorporate HALEU fuel, and manufacturing techniques to realize propulsion systems for NTP applications that balance thrust, specific impulse, and mass to provide performance that is tailored to specific missions.

SUMMARY

Presently, there is a need for improvements directed to NTP applications in which the specific impulse is in the range of 900 to 1000 seconds. This translates to propellant (i.e., hydrogen propellant) exit temperatures from the reactor in excess of 2700K (kelvin), and thus fuel temperatures in excess of 2900K. In example embodiments utilizing hydrogen propellant, exit temperature of the hydrogen propellant is on the order of 2950K for a specific impulse of 950 seconds.

Additionally, there is a need to implement HALEU fuels, so as to reduce or eliminate the use of HEU fuel. However, reactors using HALEU fuel require significant neutron moderation to produce a thermal neutron energy spectrum.

In general, the disclosure is directed to a nuclear fission reactor structure suitable for use in a nuclear-based propulsion system, such as nuclear thermal propulsion. In exemplary embodiments, the nuclear fission reactor structure utilizes a carbide-based fuel assembly containing one or more uranium-bearing fuel elements. The carbide-based fuel assembly includes a fuel assembly outer structure and also includes a carbide-based insulation layer interposed between an inner surface of the fuel assembly outer structure and one or more uranium-bearing fuel elements located in the assembly. One or more carbide-based support meshes are positioned at the longitudinal ends of the fuel element and can also separate the fuel elements into sections.

The form of the fuel element is not particularly limited. In some embodiments, the fuel element is in the form of a plurality of individual elongated fuel bodies, such as rods or rodlets, arranged in a fuel bundle. In other embodiments, the fuel element is in the form of one or more fuel monolith bodies containing flow channels for coolant. In some aspects, there is one fuel monolith body, in other aspects, there is more than one fuel monolith body. The fuel monolith body can be in suitable shape(s) for assembling into the space within the fuel assembly occupied by the one or more fuel elements. For example, fuel monolith bodies having the shape of wafers, layers, pie-shaped sections, and cylinders can be utilized and arranged next to each other in a single layer and/or stacked on each other in multiple layers.

Preferably, the fuel element uses a fuel composition including HALEU.

In NTP applications, the nuclear fission reactor structure is housed in the vessel of a nuclear thermal propulsion reactor and engine. Propulsion gas is used as a coolant for the nuclear fission reactor structure. Propulsion gas heated in the active core region of the nuclear fission reactor structure exits through a nozzle and generates thrust.

An embodiment of a carbide-based fuel assembly comprises a fuel assembly outer structure formed of a ceramic matrix composite material, a first fuel element contained within the fuel assembly outer structure, and an insulation layer formed of a first refractory ceramic material. The insulation layer is interposed between an inner surface of the fuel assembly outer structure and the first fuel element, is spaced apart from the first fuel element, and extends between a first end surface of the first fuel element and a second end surface of the first fuel element.

In one aspect, the first fuel element includes a plurality of individual elongated fuel bodies, such as fuel rods, each of which contains a fuel composition and is elongated and longitudinally extends from a first end to a second end along a longitudinal axis of the respective elongated fuel body. The plurality of elongated fuel bodies are arranged in spaced-apart relationship relative to each other in a fuel bundle. Within the fuel bundle, the plurality of elongated fuel bodies are located at positions that are axisymmetric about the longitudinal axis of the carbide-based fuel assembly, as seen in cross-section in a plane perpendicular to the longitudinal axis of the carbide-based fuel assembly, and an empty space between the spaced-apart elongated fuel bodies in the fuel bundle is a coolant flow volume thorough which a coolant in the form of a propellant gas flows during operation of a reactor containing the carbide-based fuel assembly.

In another aspect, the first fuel element includes one or more fuel monolith bodies. Each fuel monolith body contains a fuel composition and includes one or more coolant flow channels. One or more coolant flow channels is a coolant flow volume thorough which a coolant in a form of a propellant gas flows during operation of a reactor containing the carbide-based fuel assembly. The one or more fuel monolith bodies can be in any suitable shape, such as a wafer, a layer, a pie-shaped section, or a cylinder, and these shapes can be arranged next to each other in sections or in a layer, stacked on top of each other, or otherwise positioned to form the fuel element.

Disclosed carbide-based fuel assemblies can be incorporated into a nuclear fission reactor structure. An example embodiment of a nuclear fission reactor structure comprises a moderator block including a plurality of fuel assembly openings and a plurality of the carbide-based fuel assemblies. Each of the plurality of carbide-based fuel assemblies is located in a different one of the plurality of fuel assembly openings. In a cross-section of the moderator block perpendicular to the longitudinal axis of the nuclear fission reactor structure, the plurality of carbide-based fuel assemblies are distributively arranged in the moderator block.

Embodiments of the nuclear fission reactor structure can be incorporated into a nuclear thermal propulsion engine. An example nuclear thermal propulsion engine comprises the disclosed nuclear propulsion fission reactor structure, shielding, a reservoir for cryogenically storing a propulsion gas, turbomachinery, and a nozzle. In a flow path of the propulsion gas, the shielding, the turbomachinery, and the reservoir are operatively mounted upstream of the inlet connection assembly of the carbide-based fuel assemblies, and the nozzle is operatively mounted downstream of the outlet connection assembly of the carbide-based fuel assemblies.

The nozzle provides a flow path for heated propulsion gas exiting the nuclear propulsion fission reactor structure.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

FIGS. 3A-3C schematically illustrate aspects of an embodiment of a carbide-based fuel assembly, in particular features at a first end of the carbide-based fuel assembly.

Figure 1:
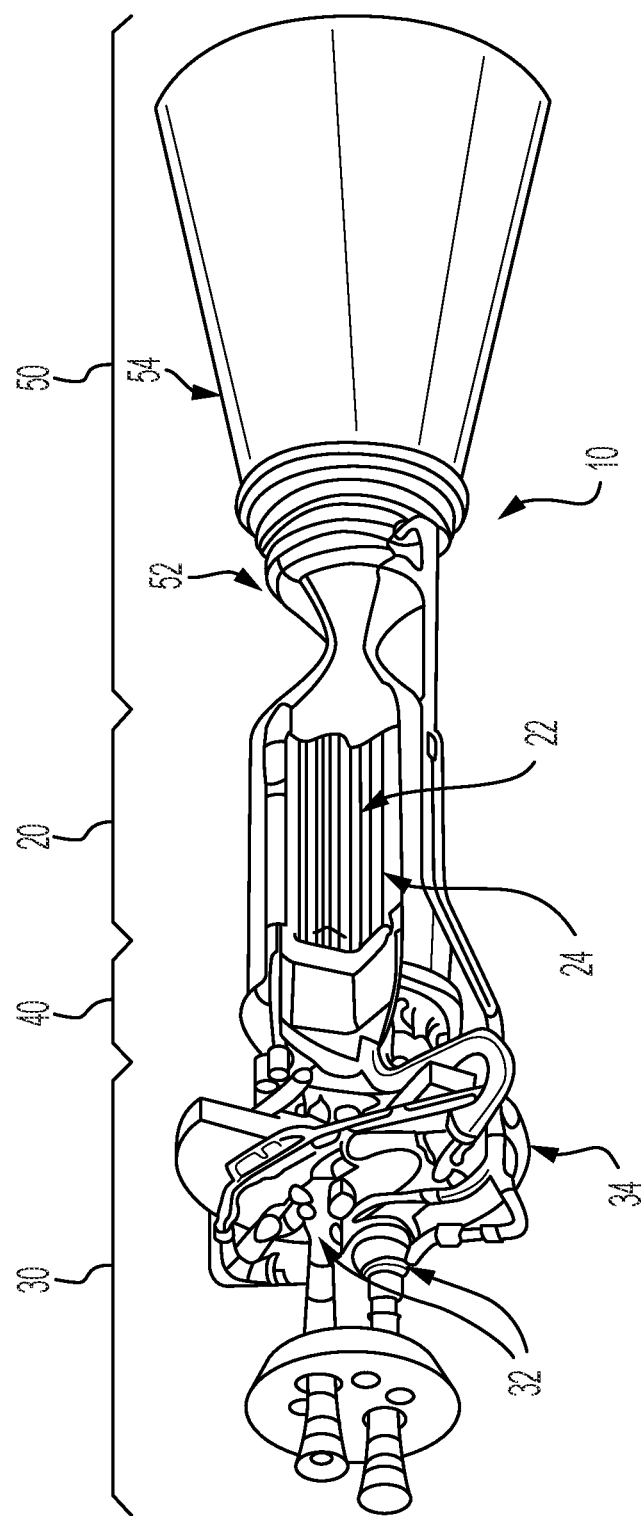
FIG. 1 illustrates structure and arrangement of features in a typical design for a nuclear thermal propulsion reactor and engine.

For ease of viewing, in some instances only some of the named features in the figures are labeled with reference numerals.

DETAILED DESCRIPTION

Figure 2B:
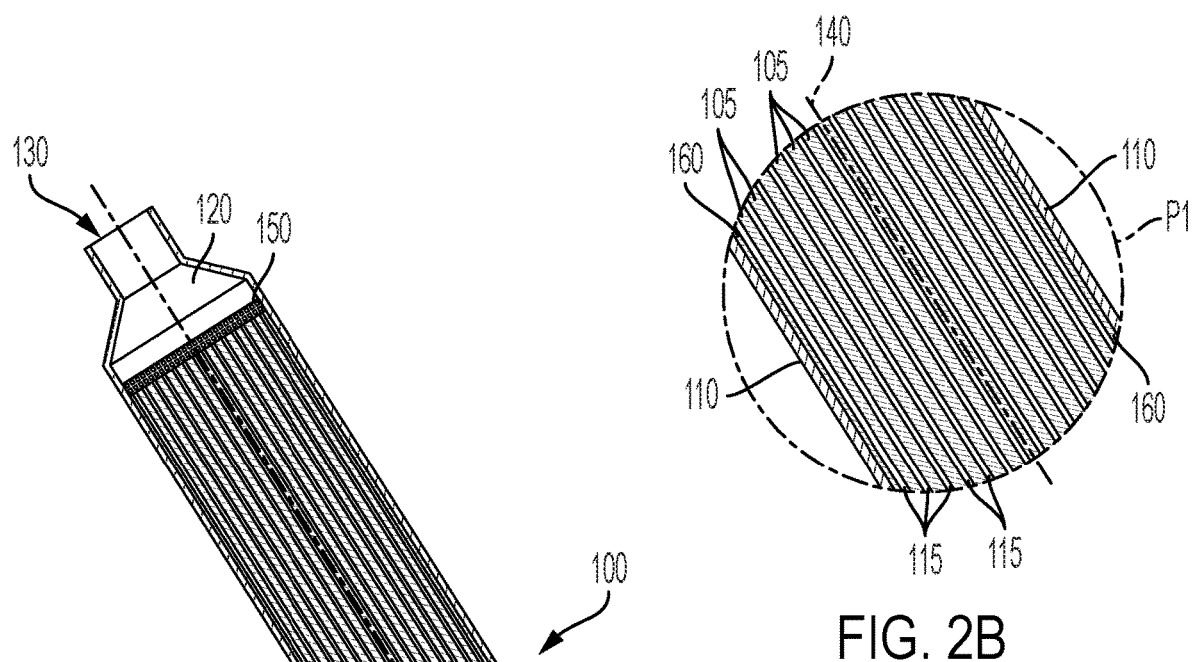
FIGS. 2A and 2B schematically illustrate, in a longitudinal cross-sectional view, an embodiment of a carbide-based fuel assembly.
Figure 2A:
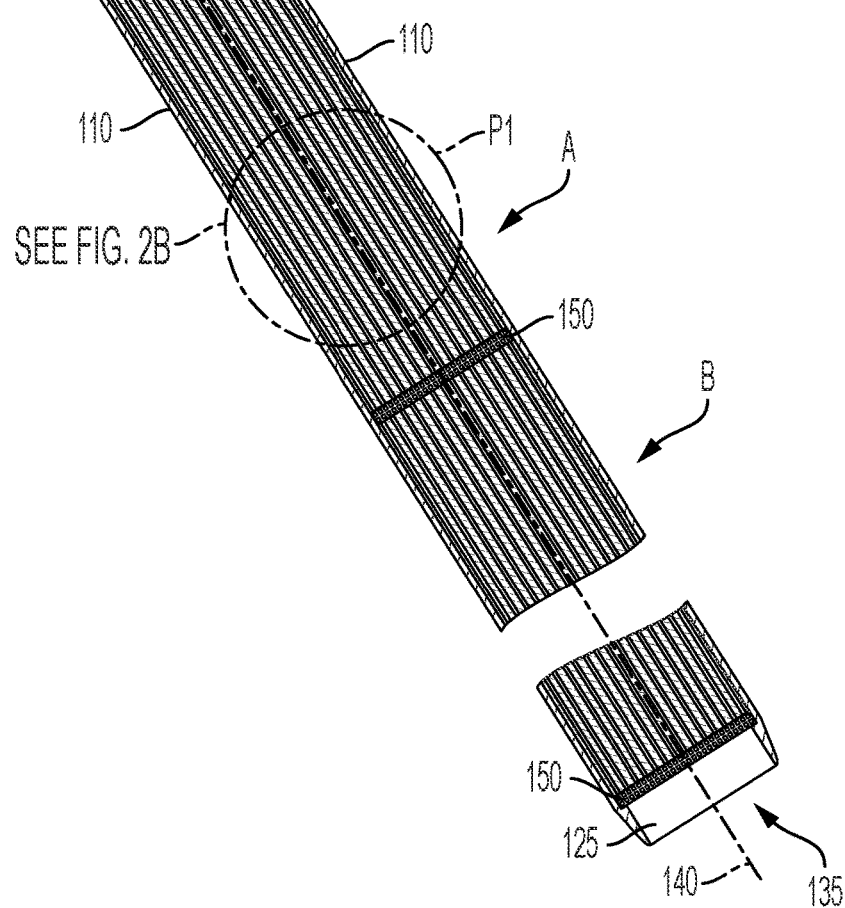

FIGS. 2A and 2B. schematically illustrate, in a longitudinal cross-sectional view, an embodiment of a carbide-based fuel assembly. FIG. 2B is a magnified view of region P1 of FIG. 2A. The exemplary carbide-based fuel assembly 100 includes one or more fuel elements 105 that are contained within a fuel assembly outer structure 110. In FIGS. 2A and 2B, the fuel elements 105 have an elongated, longitudinally slender form extending from a first end to a second end along a longitudinal axis of the respective fuel element. Typically, the longitudinal axis of the individual elongated fuel bodies extends in a direction that is parallel to other structures in the fuel assembly, such as the fuel assembly outer structure 110 or the longitudinal axis 140 of the carbide-based fuel assembly 100. Although the term "rod" is used herein in connection with the fuel element 105, the cross-sectional shape in a plane perpendicular to the longitudinal axis of the fuel element 105 is not limited and can be any suitable shape, including a polygon (such as a triangle, a quadrilateral, a pentagon, a hexagon, a heptagon, an octagon, a nonagon, a decagon, a hendecagon, and a dodecagon), a circle, and an oval. Preferably the cross-sectional shape of the fuel element is a regular polygon, although irregular polygons can also be utilized.

The plurality of fuel elements 105 contained within the fuel assembly outer structure 110 are in spaced-apart relationship relative to each other. The spaced-apart relationship between nearest neighbor fuel elements 105 creates an empty space that defines a volume, also called herein a coolant flow volume 115, through which coolant, in the form of propellant gas, flows during operation of a NTP reactor containing the carbide-based fuel assembly 100.

Also, while in the illustrated embodiment in FIGS. 2A-B the fuel elements 105 are rods and the coolant flowing though the coolant flow volume 115 contacts exterior surfaces of the fuel elements 105, the fuel element(s) 105 can have other forms as disclosed herein. For example, if in the form of a fuel monolith body, FIGS. 2A-B would schematically illustrate fuel-bearing material 105 in the fuel monolith body and the flow volume 115 would be in the form of a plurality of flow channels in the fuel monolith body through which coolant flows, which results in the coolant flowing though the coolant flow volume 115 contacting the inner diameter surface of the flow channels that are interior to the fuel monolith body.

In exemplary embodiments, the fuel assembly outer structure 110 is formed of a ceramic matrix composite (CMC) material. An example suitable CMC material is a SiC—SiC composite. A SiC—SiC composite has a silicon carbide (SiC) matrix phase and a silicon carbide (SiC) fiber phase incorporated together. A SiC—SiC composite is preferred for the fuel assembly outer structure 110. Desirable properties of SiC—SiC composite materials include high thermal, mechanical, and chemical stability and a high strength to weight ratio. Advantageous properties of SiC—SiC composite materials for nuclear applications include damage tolerance (non-brittle failure behavior), relatively low thermal conductivity, mechanical properties that are retained to temperatures exceeding 1500K, and not being adversely affected by neutron irradiation. Furthermore, SiC is not a parasitic neutron absorber and the carbon atoms actually provide some amount of neutron moderation.

The fuel elements 105 and the coolant flow volume 115 are contained within the fuel assembly outer structure 110, which connects an inlet flow adapter 120 (at a first end of the carbide-based fuel assembly 100) to an outlet flow adapter 125 (at a second end of the carbide-based fuel assembly 100). The inlet flow adapter 120 can be attached to the upper end of the fuel assembly outer structure 110. In some embodiments, the upper end of the fuel assembly outer structure 110 is brazed to a metal component prior to loading fuel into the carbide-based fuel assembly 100. Afterward, the inlet flow adapter 120 can be mechanically attached to the brazed metal component. In some embodiments, the outlet flow adapter 125 can be attached to the lower end of the fuel assembly outer structure 110 by a mechanical means, or alternatively via brazing. In other embodiments, the outlet flow adapter 125 can be incorporated into the fuel assembly outer structure 110 during manufacture, i.e., the outlet flow adapter 125 can be an integral part of the fuel assembly outer structure 110. Also, the lower end of the fuel assembly outer structure 110 and the outlet flow adapter 125 interface with a support plate for mounting the carbide-based fuel assembly 100 within a reactor structure.

In some embodiments, one or more fuel elements 105 are contained within a single section within the fuel assembly outer structure 110. In other embodiments, multiple sections (each containing one or more fuel elements 105) are contained within the fuel assembly outer structure 110. In which case, the individual sections, such as sections A and B in FIG. 2A, are separated by a support mesh 150. Each section in the carbide-based fuel assembly 100, e.g., section A and section B, is bounded at a first end and at a second end by a support mesh 150. Thus, a first support mesh is located at the first end surface of the one or more fuel elements 105 in a first section and a second support mesh located at the second end surface of the one or more fuel elements 105 in the first section. If a second section is present, then the one or more fuel elements 105 in the second section are separated from those in first section in a longitudinal direction by one of the first support mesh 150 and the second support mesh 150 (depending on the location of the second section relative to the first section, i.e., adjacent the first end surface or adjacent the second end surface of the one or more fuel elements 105 in the first section). In addition, a third support mesh 150 can be located at an opposite end from the one first or second support mesh separating the second section from the first section. Further, in arrangements with either a single section or multiple sections, a support mesh 150 is typically included at the first end of the carbide-based fuel assembly 100 (in the area of the inlet flow adapter 120) and at the second end of the carbide-based fuel assembly 100 (in the area of the outlet flow adapter 125).

The support mesh 150 is a structure traversing the inner volume of the fuel assembly outer structure 110 (typically in a plane perpendicular to the longitudinal axis 140 as seen in, e.g., FIGS. 2A and 3A). The support mesh 150 includes openings traversing a thickness of the support mesh 150 to allow coolant flow through the support mesh 150, for example, the openings 152 in the support mesh 150 are configured to allow coolant flowing through the carbide-based fuel assembly 100 from entrance opening 130 and out through exit opening 135 to flow through the openings 152 in the support mesh 150.

FIG. 3A is a cross-sectional view (in a plane containing the longitudinal axis 140) and showing a first end of an embodiment of a carbide-based fuel assembly 100. As seen in FIG. 3A, the exemplary carbide-based fuel assembly 100 includes an insulation layer 160, which is interposed between the inner surface of the fuel assembly outer structure 110 and the one or more fuel elements 105. In embodiments in which the fuel form is individual elongated fuel bodies, the coolant volume is the open space around the individual elongated fuel bodies and the insulation layer 160 is interposed between the inner surface of the fuel assembly outer structure 110 and the envelope surface of the spaced-apart assembly of the plurality of fuel elements while still allowing a flow volume between the surface of the outer-most fuel element(s) and the insulation layer 160. In embodiments in which the fuel form is one or more fuel monolith bodies, the coolant channels provide the flow volume. The insulation layer 160 is interposed between the inner surface of the fuel assembly outer structure 110 and the radial outermost surface of the fuel monolith body so as to have minimal flow between the radial outer surface of the fuel element and the insulation layer 160. The insulation layer 160 can extend the whole length of the fuel assembly 100, from the lower end of the upper support mesh 150 and into the outlet flow adapter 125. Alternatively, the insulation layer 160 extends between a first end surface of the one or more fuel elements 105 and a second end surface of the one or more fuel elements 105 in each section (or, in other words, between a first end surface of the one or more fuel elements within a section and second end surface of the one or more fuel elements within the section). In exemplary embodiments, the insulation layer 160 is spaced apart from the fuel elements 105 to allow coolant traveling through the coolant flow volume 115 to be in contact with the outer circumference surface of the fuel elements 105. This includes that portion of the outer circumference surface that is facing/located closest to the insulation layer 160, e.g., radially closest in direction R relative to the longitudinal axis 140 of the carbide-based fuel assembly 100 (see FIG. 3A).

The insulation layer 160 can be formed from any suitable material for the temperatures and forces expected during use of the carbide-based fuel assembly 100 in a NTP reactor and to provide thermal protection for the CMC material, in particular the SiC—SiC composite, forming the fuel assembly outer structure 110. The material of the insulation layer 160 should also be chemically compatible with the CMC material. For example, the insulation layer 160 can be formed of a refractory ceramic material. An example refractory ceramic material is zirconium carbide, particularly porous zirconium carbide. In exemplary embodiments, the refractory ceramic material is porous with 60 to 85%, alternatively 70-85% or 72-76% or 78-82%, of the volume consisting of void spaces, and the porosity is selected in order to provide a balance between insulation value and mechanical properties.

In exemplary embodiments, the refractory ceramic material for the insulation layer 160 is zirconium carbide. For example, the zirconium carbide is non-stoichiometric and is deficient in carbon with a maximum carbon content for single phase $ZrC_x$ of 0.98. An optimum carbon to zirconium ratio is in the range of 0.85 to 0.96, alternatively in a range of 0.90 to 0.95.

In one example, the refractory ceramic material for the insulation layer 160 is 90% to 99.999% zirconium carbide foam, alternatively 95% to 99.999% zirconium carbide foam. Suitable zirconium carbide foam for the insulation layer 160 is available from Ultramet, Inc. of Pacoima, CA. In another example, the refractory ceramic insulation is in the form of 95% to 99.999% fibrous zirconium carbide. Porous zirconium carbide insulation maintains its functionality to temperatures on the order of 3000K. Thus, the use of porous zirconium carbide insulation allows the use of the CMC structural material over the full length of the fuel assembly outer structure 110.

The insulation layer 160 can optionally extend longitudinally to the location of the support mesh 150, as shown in region 165 in FIG. 3A. In region 165, the insulation layer is interposed between a radially outer surface 154 of the support mesh 150 and the inner surface of the fuel assembly outer structure 110. Alternatively, and as schematically illustrated in FIG. 5B, the end surface of the insulation layer abuts an outer region 158 of the support mesh 150.

FIG. 3B schematically illustrates an embodiment of a support mesh 150. In FIG. 3B, the support mesh 150 is seen in plan view looking along longitudinal axis 140 (as opposed to the edge plan view, i.e., perpendicular to longitudinal axis 140, of the support mesh 150 as shown in FIG. 3A). The support mesh 150 is sufficiently sized and constructed so as to allow coolant traveling through the carbide-based fuel assembly 100 to pass through the support mesh 150 while the support mesh 150 also holds the one or more fuel elements 105 in place axially (i.e., relative to the longitudinal axis 140). For example, the support mesh 150 includes a first region 156 having the openings 152 traversing the thickness of the support mesh 150. The characteristics of the openings 152, such as size, location and tortuosity of the path from a first side to a second side of the support mesh 150, are selected so that there is minimal differential pressure drop for the coolant traveling through the openings 152. For example, in some embodiments, the structure of the support mesh will be designed such that the open area for coolant flow through the support mesh will be greater than that defined for the coolant flow volume 115. Also for example, in some embodiments, the pressure drop for the coolant traveling through the openings 152 is in the range of 30 to 100 psi (about 206 KPa to 690 KPa. Secondarily, the openings 152 are interconnected internally within the body of the first region 156 so as to allow coolant mixing, which can contribute to reduce the radial temperature gradients within successive fuel element sections.

The support mesh 150 can include an optional outer region 158. The outer region 158 can enclose the first region 156, which thereby is effectively an interior region relative to the outer region 158. For example, depending on the geometric shape of the first region 156, the outer region 158 can enclose a perimeter of the first region 156. Where the geometric shape of the first region 156 is circular, the outer region 158 can circumferentially enclose the first region 156 and the first region 156 can effectively be a radially interior region. In one aspect, the outer region 158 can have a higher density (lower porosity) than the first region 156. In another aspect, the outer region 158 can be devoid of openings. In either aspect, the mechanical strength of the outer region 158 is designed to support the weight and forces related to stacking a first section of a one or more fuel elements 105 on a second section of one or more fuel elements 105 (as shown in, e.g., FIG. 2A with regard to section A and section B).

The support mesh 150 can be formed from any suitable material for the temperatures and forces expected during use of the carbide-based fuel assembly 100 in a NTP reactor and which is chemically stable in contact with other components of the fuel assembly. For example, the support mesh 150 can be formed of a refractory ceramic material. An example refractory ceramic material is zirconium carbide or niobium carbide. In exemplary embodiments, the refractory ceramic material includes pores separated by continuous carbide ligaments. In exemplary embodiments, the porosity of the support mesh 150 is in the range of 30-70%, alternatively in the range of 40-60%. For both zirconium carbide and niobium carbide, it is preferable that the material be near-stoichiometric (i.e., has a carbon to metal ratio above 0.95). Typically, the porosity of the support mesh 150 will be less than the porosity of the insulation material 160.

The openings 152 in the support mesh 150 can be formed by suitable means. For example, the support mesh 150 can be formed as an open cell structure where the open cells forming the openings 152 are formed during the manufacturing process of the body of the support mesh. Examples include refractory ceramic material that is 90% to 99.999%, alternatively 95% to 99.999% or 99% to 99.999%, zirconium carbide or niobium carbide in the form of an open-cell foam structure. Alternatively, the support mesh 150 can be formed as a solid body and the openings subsequently formed by chemical or mechanical processes, such as etching or machining. In one specific embodiment, the support mesh 152 is formed in an additive manufacturing process and both the body of the support mesh and the openings are formed during the manufacturing process as an integral unit.

FIG. 3C is a schematic, perspective view of the first end of an embodiment of a carbide-based fuel assembly 100. The view illustrated in FIG. 3C is similar to that shown in FIG. 3A, but with the inlet flow adapter 120 and the support mesh 150 removed and in perspective view. In this view, the first end surfaces 170 of the fuel elements 105 (in this case, in the form of a plurality of fuel rods) are visible within the fuel assembly outer structure 110. Also visible is the radial distribution of the individual fuel elements 105. In the illustrated radial distribution, a central fuel element 105*a* is located substantially (i.e., within manufacturing tolerances) coaxial with the longitudinal axis 140 of the carbide-based fuel assembly 100 and the remaining fuel elements 105 are located, in spaced-apart relation, at positions that are axisymmetric to the central fuel element 105*a*. Further visible in FIG. 3C is the insulation layer 160, which in this embodiment is conformal to and in contact with the inner surface of the fuel assembly outer structure 110. As indicated by arrow 180, the support mesh 150 is fitted into the space formed by a longitudinal extension of the fuel assembly outer structure 110 and insulation layer 160 past the end surfaces 170 of the fuel elements 105.

The fuel elements 105 can be of various compositions. In general, the fuel elements 105 within the carbide-based fuel assembly 100 have a composition that comprises a fuel composition including HALEU. In particular embodiments, the HALEU has a U-235 assay above 5 percent and below 20 percent. In optional embodiments, the fuel elements 105 have a theoretical density of 95% or greater. In addition, the fuel elements 105 with a carbide-based composition can be refractory carbide coated and the fuel elements 105 with a cermet-based composition can be refractory metal coated.

In some embodiments, such as when the fuel element is in the form of an elongated fuel body, the fuel composition includes a binary carbide containing uranium or a ternary carbide containing uranium. Examples of a binary carbide containing uranium include (U,Zr)C, such as UC—ZrC. Examples of a ternary carbide containing uranium include (U,Zr,Nb)C, such as UC—ZrC—NbC.

In some embodiments, such as when the fuel element is in the form of a carbide-based fuel monolith body, the fuel composition includes a binary carbide containing uranium or uranium nitride. Examples of a binary carbide containing uranium include (U,Zr)C, such as UC—ZrC. The fuel monolith body includes a carbide matrix in which the fuel composition is distributed. Alternatively, the fuel monolith body includes a refractory metal matrix in which the fuel composition is distributed (i.e., a cermet monolith). Depending on the peak fuel temperatures of the nuclear reactor for nuclear thermal propulsion in which the fuel element in the form of a cermet monolith body is used, other fuel compositions can be used. For example, for reactors designed to operate with peak fuel temperatures below about 2850K, uranium oxide or uranium nitride can be used as the fuel material in the fuel composition in the refractory metal matrix, while for reactors designed to operate with peak fuel temperatures above about 2850K, uranium nitride can be used as the fuel material in the fuel composition in the refractory metal matrix.

Also, the disclosed carbide-based fuel assembly structure is not restricted to assemblages of carbide-based fuel rods, and the structures and functions disclosed herein for the assemblages of carbide-based fuel rods can also be applied to monolithic carbide fuel elements containing flow channels or monolithic cermet fuel elements containing flow channels. For example, the fuel composition can be in the form of a ceramic-ceramic (cercer) composite, such as uranium nitride fuel embedded within a $ZrC_x$ matrix phase. In another particular embodiment, the composition of the cercer fuel includes uranium nitride with $ZrC_x$. In a particular embodiment, the composition of the cercer fuel includes (U,Zr)C with $ZrC_x$. Also, for example, the fuel composition can be in the form of a cermet, such as uranium nitride fuel within a W or Mo (or mixtures thereof) matrix. In one particular embodiment, the composition of the cermet fuel includes uranium nitride, tungsten, and molybdenum. In another particular embodiment, the composition of the cermet fuel includes uranium oxide, tungsten, and molybdenum.

FIG. 3C illustrates cylindrical fuel elements 105, but the fuel elements 105 can be made in other geometries, as noted herein. In addition, shapes of the fuel elements 105 can be used that (a) increase surface area to volume ratio, (b) interlock with each other, and (c) enhance propellant/cooling mixing (such as with a twisted shape). For example, a twisted ribbon design for the fuel elements 105 can create sufficient openings between the fuel elements 105 for coolant flow, in which case, there may be no need to include other means to create a flow passages between the individual fuel elements 105. Also, the composition and/or length of the fuel elements 105 can be selected to facilitate axial zoning to provide a desired axial power profile.

Figure 4B:
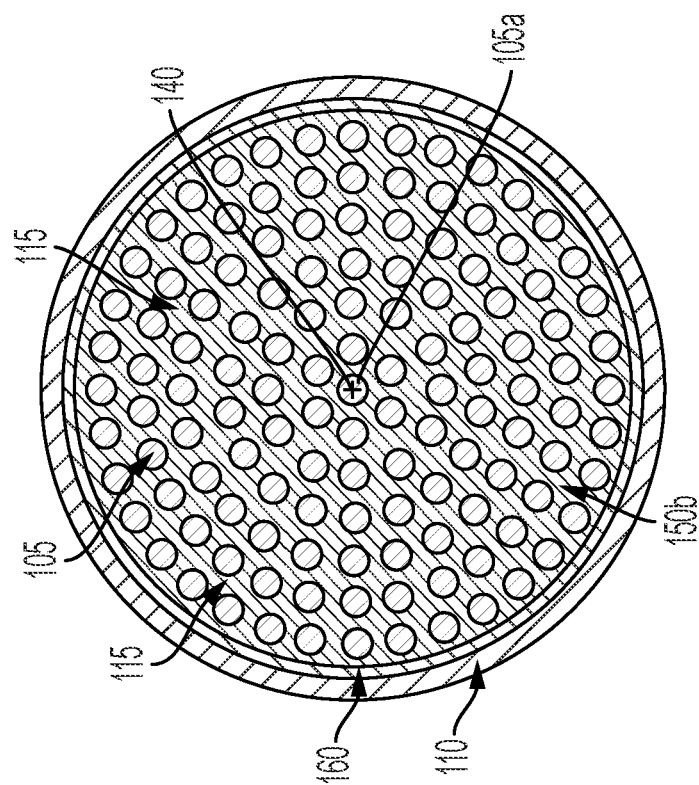
FIG. 4B is a cross-sectional view taken along section A-A in FIG. 4A.
Figure 4A:
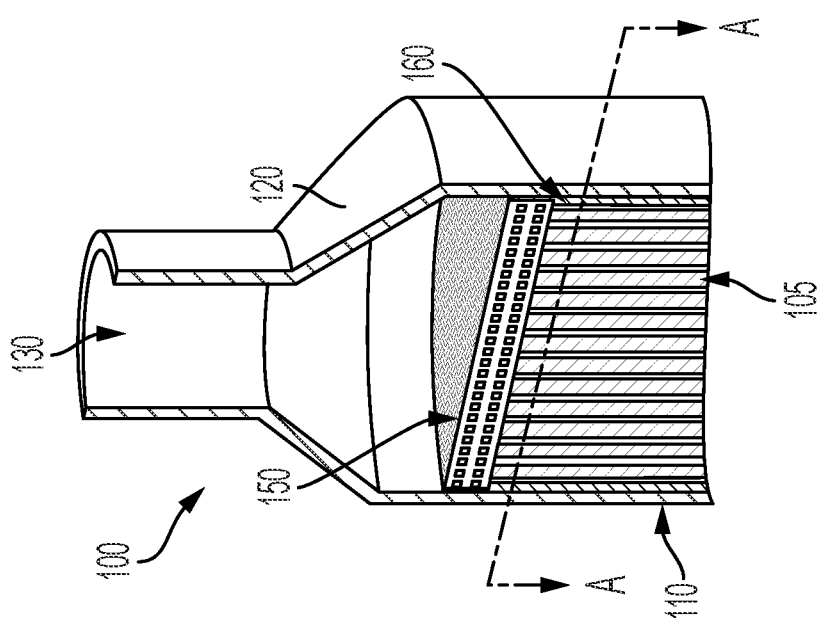
FIG. 4A is a perspective, cross-sectional view of a first end of a carbide-based fuel assembly

FIG. 4A is a perspective, cross-sectional view of a first end of a carbide-based fuel assembly 100 and FIG. 4B is a cross-sectional view taken along section A-A in FIG. 4A. The FIG. 4A view is a perspective view similar to the cross-sectional side view in FIG. 3A and illustrates many of the same features. The FIG. 4B view illustrates the spaced apart relationship between the individual fuel elements 105 and the empty space therebetween that defines the coolant flow volume 115 thorough which coolant flows during operation of a NTP reactor containing the carbide-based fuel assembly 100. Additionally, the FIG. 4B view is from the viewpoint of along the longitudinal axis 140 of the carbide-based fuel assembly 100 (which, in this case, is co-axial to the longitudinal axis of a center fuel element 105*a*) and a surface of a second support mesh 150*b* is visible through the coolant flow volume 115.

Figure 5A:
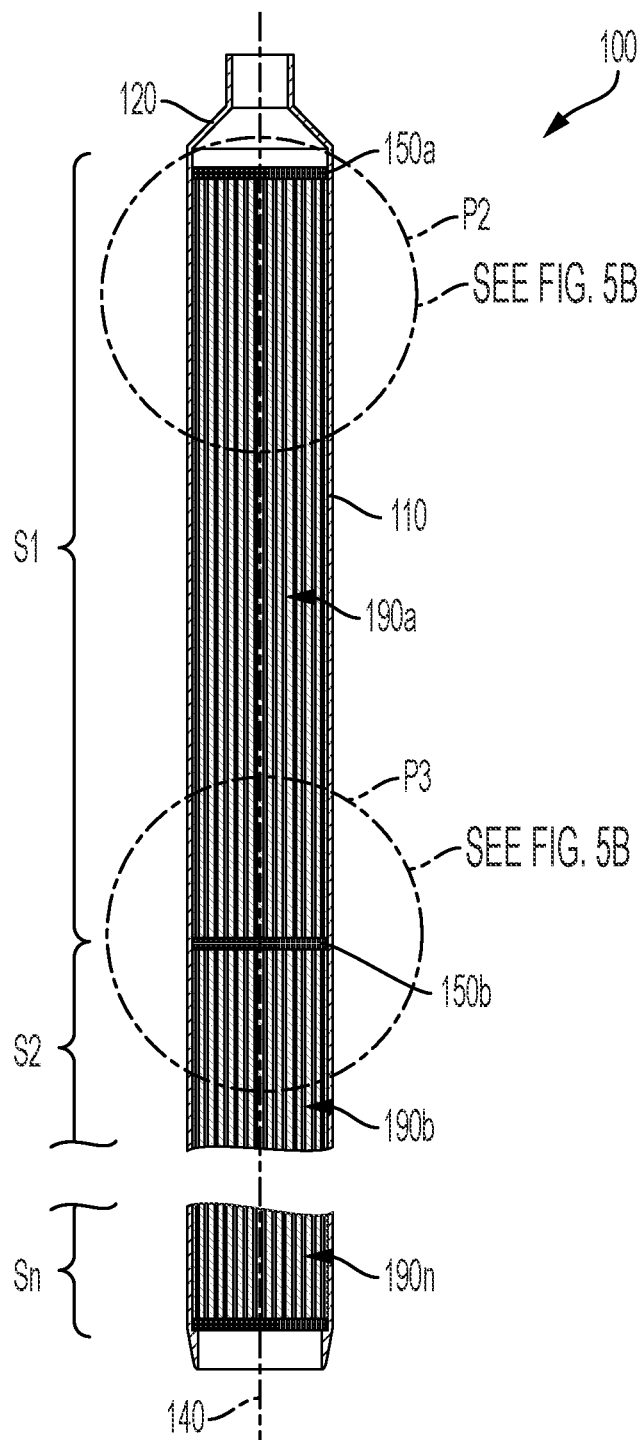
FIG. 5A is another view of the longitudinal cross-sectional view of the carbide-based fuel assembly embodiment of FIG. 2A
Figure 5B:
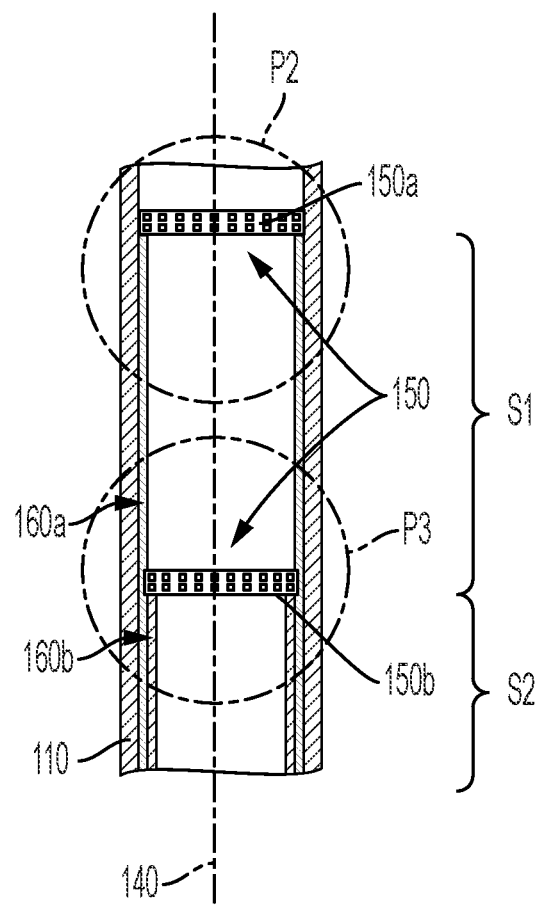
FIG. 5B is a magnified view of regions P2 and P3 in FIG. 5A schematically showing non-fuel structural features.

FIG. 5A is another view of the longitudinal cross-sectional view of the carbide-based fuel assembly embodiment of FIG. 2A and FIG. 5B is a magnified view of regions P2 and P3 in FIG. 5A schematically showing non-fuel structural features. In particular, FIG. 5B illustrates the step-wise increase in insulation layer 160 thickness that is present as a function of position along the longitudinal length of the fuel assembly 100. Two sections S1, S2, each associated with a one or more fuel elements (not shown), are illustrated in the embodiment in FIG. 5B and are arranged in that order along the longitudinal axis 140, with section S1 being (relative to section S2) an upper section closer to the inlet or first end of the of the carbide-based fuel assembly 100 and S2 being (relative to section S1) a lower section closer to the outlet or second end of the of the carbide-based fuel assembly 100. Additional sections (not shown) can follow section S2 longitudinally, e.g., section S3, section S4, . . . , section Sn, each section separated from an adjacent section by a support mesh. Also, when Section S1 is the uppermost section closest to the inlet, section S1 is separated from the inlet flow adapter 120 by a first support mesh 150*a* and separated from section S2 by a second support mesh 150*b*. And, when Section S2 is the lowermost section closest to the outlet, section S2 is separated from the outlet flow adapter 125 by a lower support mesh and separated from a preceding section by an upper support mesh.

As illustrated in FIG. 5B, a first insulation layer 160*a* is interposed between the inner surface of the fuel assembly outer structure 110 and the perimeter of the envelope surface of an assemblage of one or more fuel elements 105 forming a first fuel element bundle 190*a* that is located in section S1. This first insulation layer 160*a* also extends longitudinally between the inner surface of the fuel assembly outer structure 110 and a perimeter of an envelope surface of an assemblage of one or more fuel elements 105 forming a second fuel element bundle 190b that is located in section S2. Additionally, in section S2, a second insulation layer 160b is interposed between an inner surface of the first insulation layer 160a and the perimeter of the envelope surface of the second fuel element bundle 190b.

Also illustrated in FIG. 5B is the stacked nature of the insulation layer and support mesh. Thus, a first end surface of the first insulation layer 160a abuts an outer region 158 of the first support mesh 150a and a first end surface of the second insulation layer 160b abuts an outer region 158 of the second support mesh 150b.

Progressing from the inlet to the outlet of the carbide-based fuel assembly 100, the layer thickness of the insulation layer(s) in each section increases. The insulation thickness increases with expected increase in temperature in each subsequent section during operation.

In addition, it is optional whether the first section (S1) located at the upper section or inlet of the carbide-based fuel assembly 100 has a layer of insulation or not. The CMC material of the fuel assembly outer structure 110 may be capable of providing suitable thermal performance under the temperatures anticipated during the initial heating of the coolant.

Furthermore, while FIG. 5B shows stepwise increases in the thickness of the insulation layer, alternative designs for the insulation layer and the ceramic matrix composite (CMC) of the fuel assembly outer structure 110 that also position the support meshes are possible. For example, an alternative arrangement can include each support mesh 150 extending to an inner surface of the fuel assembly outer structure 110 and the insulation layer 160 for each section (S1, S2, etc) would then have a form of a tubular component that is inserted into the fuel assembly outer structure 110 and can be positioned on top of a support mesh, such as abutting the outer region 158. For this alternative arrangement, the radial dimensions of the outer surface of the insulation layer 160 and support mesh 150 would be the same in each section (S1, S2, etc) of the fuel assembly 100. Optionally, it may be possible to maintain a thin portion at the end of insulation layer 160 into which a support mesh 150 can be inserted as illustrated in region 165 in FIG. 3A.

FIGS. 5A and 5B also illustrate the use of more than one support mesh 150. One advantage of using multiple support meshes 150 is that the individual fuel elements 105 can be substantially shorter than the length of the entire carbide-based fuel assembly 100. In general, the use of (relatively) shorter fuel elements 105 (whether in the form of elongated bodies or monolith bodies), for example, less than a full length of the entire carbide-based fuel assembly 100, less than half the length of the entire carbide-based fuel assembly 100, or less than a quarter of the length of the entire carbide-based fuel assembly 100, facilitates axially zoning of fuel enrichment to provide a desired axial power profile. Additionally, using multiple support mesh 150 obviates the need for complex cross-sectional shapes that would otherwise be needed to support one set of fuel elements atop the below sets of fuel elements (or, stated otherwise, without the need for complex cross-sectional shapes for the fuel elements that would be needed to support a first fuel element bundle atop a second fuel element bundle). The use of multiple support meshes 150 also eliminates the need for precise alignment of the flow volume from one section of fuel elements to the adjacent section, particularly when the fuel elements are in the form of monolithic bodies containing flow channels. Further, the presence of a support mesh 150 between sections within the carbide-based fuel assembly 100 enhances the probability of continued operation with damaged fuel elements, because the sections would be independently supported by the associated support mesh(es). For example, the support meshes between the sections would limit any debris from damaged fuel elements to the one affected section, rather than allowing the debris to move throughout successive sections of the fuel assembly.

In operation, the propellant, such as hydrogen, enters the carbide-based fuel assembly 100 at an upper end, for example via inlet flow adapter 120, and is heated by flowing past the fuel elements 105 and exits the carbide-based fuel assembly 100 at the lower end, for example via outlet flow adapter 125. The fuel assembly outer structure 110 (particularly if made from a SiC—SiC composite material) in combination with the porous insulation layer 160 (particularly if made from porous zirconium carbide material) serves to separate the fuel and the hot propellant from the moderator material. Consequently, while the propellant temperature toward the lower end of the carbide-based fuel assembly 100 may exceed 2900K, the temperature at the outer surface of the carbide-based fuel assembly 100 adjacent to the moderator block 200 will be less than about 800K.

Figure 6:
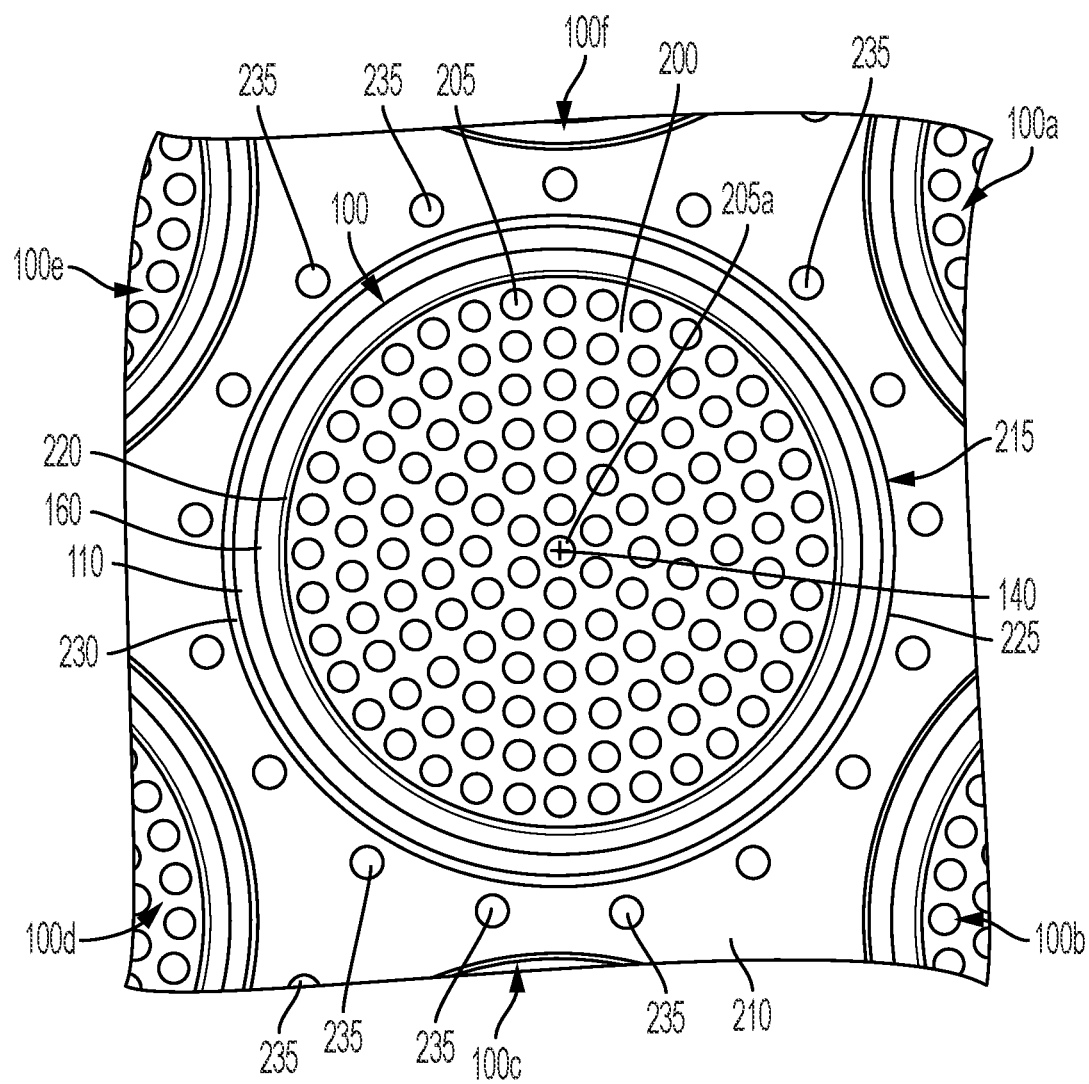
FIG. 6 schematically illustrates, in a radial cross-sectional view, an embodiment of carbide-based fuel assemblies in a nuclear fission reactor structure.

FIG. 6 schematically illustrates, in a radial cross-sectional view, an embodiment of a carbide-based fuel assembly 100 in a nuclear fission reactor structure. In the FIG. 6 embodiment, the fuel element is in the form of a solid monolithic fuel body 200 containing flow channels 205, but other embodiments could use fuel elements in the form of elongated bodies (for example, as shown and described with regard to FIGS. 2A-B. The illustrated cross-sectional view shows a portion of a plane perpendicular to a longitudinal axis of the nuclear fission reactor structure. Centrally located within the FIG. 6 view is one carbide-based fuel assembly 100. Portions of additional fuel assemblies 100a-f are also shown in FIG. 6 and are distributively arranged in the moderator block 210. In particular, the moderator block 210 includes a plurality of fuel assembly openings 215 and each of the plurality of fuel assemblies 100 is located in a different one of the plurality of fuel assembly openings 215.

As seen in FIG. 6 and as previously noted, exemplary embodiments of the carbide-based fuel assembly 100 include an insulation layer 160, which is interposed between the inner surface of the fuel assembly outer structure 110 and an envelope surface of the fuel element(s) in that section of the carbide-based fuel assembly 100. Depending on the fuel form, the inner surface of the insulation layer 160 can be spaced apart from the outer surface of the envelope to form a gap 220. Typically, the insulation layer 160 is outward of the outer surface of the fuel element envelope. Where the fuel form is a plurality of elongated fuel bodies, the gap 220 is in fluid communication with the coolant flow volume 115 and coolant, such that propulsion gas traveling through the carbide-based fuel assembly 100 also flows in the gap 220. Where the fuel form is a solid monolithic body, the gap 220 is minimized. If present, however, the gap 220 can contain non-flowing gas, such as hydrogen, and can serve as thermal insulation to the carbide-based fuel assembly 100.

FIG. 6 also illustrates the spatial relationship of the carbide-based fuel assembly 100 and the fuel assembly openings 215 (defined by periphery 225) in the moderator block 210. In particular, in the illustrated embodiment, the outer surface of the fuel assembly outer structure 110 is spaced apart from the inner surface of the fuel assembly openings 215 in the moderator block 210 to form a gap 230. This gap 230 is outside of the carbide-based fuel assembly 100 and may optionally contain (non-flowing) hydrogen gas and can provide additional thermal insulation properties.

The moderator block 210 occupies the space between the fuel assemblies 100. The moderator block 210 is typically a monolithic body having a composition capable of thermalization (or moderation) of neutrons formed in the fuel assembly 100. Thermalization reduces the energy of the neutrons to values in the range of ≤ 1 eV. In exemplary embodiments, the moderator block 210 has a composition including zirconium hydride, beryllium, beryllium oxide, yttrium hydride, graphite or combinations thereof. In a specific embodiment, the moderator block 210 has a composition including zirconium hydride, in particular zirconium hydride in which the H to Zr ratio ranges from 1.85 to 1.95, e.g., $ZrH_{1.85}$ to $ZrH_{1.95}$, such as $ZrH_{1.9}$.

The moderator block 210 includes a plurality of moderator block coolant channels 235. The moderator block coolant channels 235 extend longitudinally parallel to the longitudinal axis of the nuclear fission reactor structure (which is typically parallel to the longitudinal axis 140 of the carbide-based fuel assembly 100) from a first end surface of the moderator block 210 to a second end surface of the moderator block 210. The longitudinal axis of the nuclear fission reactor structure is typically parallel to the longitudinal axis 140 of the carbide-based fuel assembly 100. Depending on the distribution of carbide-based fuel assemblies 100 at or about the longitudinal axis of the nuclear fission reactor structure, the longitudinal axes of the fuel assemblies 100 and the reactor may or may not be colinear to achieve a symmetric distribution of fuel assemblies 100 about the reactor axis. The embodiment in FIG. 6, however, does show longitudinal axis 140 of the carbide-based fuel assembly 100 coincident with the longitudinal axis of the nuclear fission reactor structure.

The plurality of moderator block coolant channels 235 are in spaced-apart relation to, and distributed about, the periphery 225 of each of the plurality of fuel assembly openings 215 in the moderator block 210. The spacing and distribution of the moderator block coolant channels 235 are generally governed by thermal management and neutronics of the carbide-based fuel assembly 100 and of the nuclear fission reactor structure. In the example embodiment shown in FIG. 6, the moderator block coolant channels 235 are approximately 2 to 6 millimeters (mm) in diameter, alternatively 4 to 6 mm in diameter, and are distributed circumferentially about the periphery of the fuel assembly openings 215 and are spaced within 2 to 12 mm, such as within 2 to 6 mm or within 6 to 12 mm, of the periphery 225.

In some embodiments, the moderator block is a single, solid unitary structure. In other embodiments, the moderator block consists of a plurality of moderator block sections that are arranged next to each other and/or on top of each other to form the overall structure of the moderator block. In which case, the moderator block can be built up from a plurality of moderator block sections. For example, it is also contemplated that there are multiple horizontally arranged layers of moderator block and that each horizontal layer of moderator block will be further subdivided into sections that are arranged next to each other.

When describing both the arrangement of the plurality of fuel elements 105 in the carbide-based fuel assembly 100 and the arrangement of the carbide-based fuel assemblies 100 in the moderator block 210, distributively arranged means in substantially uniformly spaced relationship and with a repetitive or symmetry pattern consistent with the neutronics and thermal management requirements of the fuel assembly and/or the nuclear fission reactor structure. As an example, fuel assemblies 100a-f in FIG. 6 are arranged in a hexagonal pattern around central fuel assembly 100. As another example and as shown in FIG. 4B in which there are a plurality of fuel elements each in the form of an elongated fuel body, i.e., carbide-based fuel rods, the innermost ring of fuel elements is arranged in a hexagonal pattern around a central fuel element 105a, with fuel elements outward thereof in circular rings. Other distributive arrangements for the fuel elements can be utilized, including other axisymmetric arrangements, such as based on a triangle, a square, a circle, an octagon or a decagon. It is also noted that in FIG. 4B, the central fuel element 105a is coincident with the longitudinal axis 140 of the carbide-based fuel assembly 100. This distributive arrangement also extends to the flow channels 205 in fuel elements 105 having the form of a solid monolithic fuel body 200 and, in the example illustrated in FIG. 6, a central flow channel 205a in the solid monolithic fuel body 200 is coincident with the longitudinal axis 140 of the carbide-based fuel assembly 100 and additional flow channels 205 are arranged in a hexagonal pattern around the central flow channel 205a, with flow channels outward thereof in circular rings. Other distributive arrangements for the flow channels can be utilized, including other axisymmetric arrangements, such as based on a triangle, a square, a circle, an octagon or a decagon. The distributive arrangement of the fuel elements 105 in the carbide-based fuel assembly 100, the distributive arrangement of the flow channels 205 in the solid monolithic fuel body 200 in the carbide-based fuel assembly 100, and the distributive arrangement of the carbide-based fuel assemblies 100 in the moderator block 210 may or may not be identical.

In one particular embodiment, the fuel elements 105 have a diameter of 2 to 3 millimeters (mm) and are circumferentially spaced (from nearest fuel elements at the same radial distance from the longitudinal axis 140) at a distance of 1 to 5 mm and are radially spaced (from nearest fuel elements at the next radially inward and next radially outward position) at a distance of 1 to 10 mm. In one particular embodiment, the envelope of the fuel element bundle, e.g., rods making up a bundle, has a diameter of 45 to 60 mm, alternatively 50 to 56 mm, the insulation layer 160 has a thickness in the radial direction of 2 to 6 mm, alternatively 2 to 4 mm, and the fuel assembly outer structure 110 has a thickness in the radial direction of 2 to 6 mm, alternatively 2 to 4 mm. In one particular embodiment, the envelope of the fuel element (e.g., monolith with coolant channels) has a diameter of 45 to 60 mm, alternatively 50 to 56 mm, the insulation layer 160 has a thickness in the radial direction of 2 to 6 mm, alternatively 2 to 4 mm, and the fuel assembly outer structure 110 has a thickness in the radial direction of 2 to 6 mm, alternatively 2 to 4 mm. However, the dimensions for the various features, structures, and components can vary according to design aspects, such as neutronics, thermohydraulics, weight and space requirements.

Also, the additional carbide-based fuel assemblies 100a-f have similar features and arrangement of features as described with respect to carbide-based fuel assembly 100.

The carbide-based fuel elements can be manufactured by suitable means. In the following example, a fabrication process to produce an example ternary carbide fuel element with the chemical composition (U,Zr,Nb)C is described. Although the carbide is implied to be a solid solution monocarbide, a substoichiometric composition somewhat deficient in carbon may also be used. Additionally, process variations may be included that still achieve a suitable fuel element 105.

The fabrication process for a fuel element 105 generally consists of several steps. In the first step, constituent material powders are prepared. For the example chemical composition (U,Zr,Nb)C, the constituents would include zirconium carbide, niobium carbide, a uranium containing compound, and an organic binder. Additional constituents may include graphite and/or a liquid phase sintering aid such as nickel.

The refractory metal carbides, zirconium carbide and niobium carbide, can be fabricated as monocarbide powders using conventional processes. The uranium containing compound can be uranium carbide or uranium hydride, depending on the desired carbon content of the fabricated carbide. When uranium hydride is used, graphite is also added. Overall carbon content is controlled by the atomic ratio of uranium to added graphite. The particle sizes of all constituent powders are rendered sufficiently fine by comminution.

After the constituent materials are prepared, they are blended into a uniform mixture for green body formation. One method for green body formation is extrusion. Green bodies of elements with simple geometries, such as circular cylinders or non-helical elements with convex polygon cross sections, may also be formed by rolling, depending on the rheology of the green body mixture.

After green body formation, the bodies are rendered into a dense state using high temperature sintering. Target density for a fuel element is generally at least 95% of its theoretical density (i.e., less than 5% porosity). In sintering, the green parts are heated to a very high temperature for a short period of time to develop a dense microstructure. Densification can be accelerated by the presence of a liquid phase sintering aid. In the case where uranium is added to the element material in the form of uranium hydride, the uranium hydride dissociates into uranium and hydrogen, the latter of which is outgassed from the part. The uranium and added graphite react to form uranium carbide, which is molten above about 2800K and is an effective liquid phase sintering aid. In the case where uranium is added in the form of uranium carbide, nickel can also be added. Nickel is an effective liquid phase sintering aid at temperatures above its melting temperature of about 1730K.

Although a small to moderate degree of homogenization in chemical composition does occur during liquid phase sintering, the element material in the densified body after sintering is still typically compositionally non-uniform. Therefore, following densification, the sintered densified body is held at temperatures in the range of 2400K to 2600K for an extended period (on the order of hours, e.g., 2 to 5 hours) to homogenize the chemical composition. If nickel is used as a liquid sintering aid, this heated homogenization step removes the nickel from the element material by evaporation at temperatures greater than about 2300K.

Once cooled, the fuel element 105 can optionally be refractory carbide coated by, for example, a vapor deposition technique.

Figure 7:
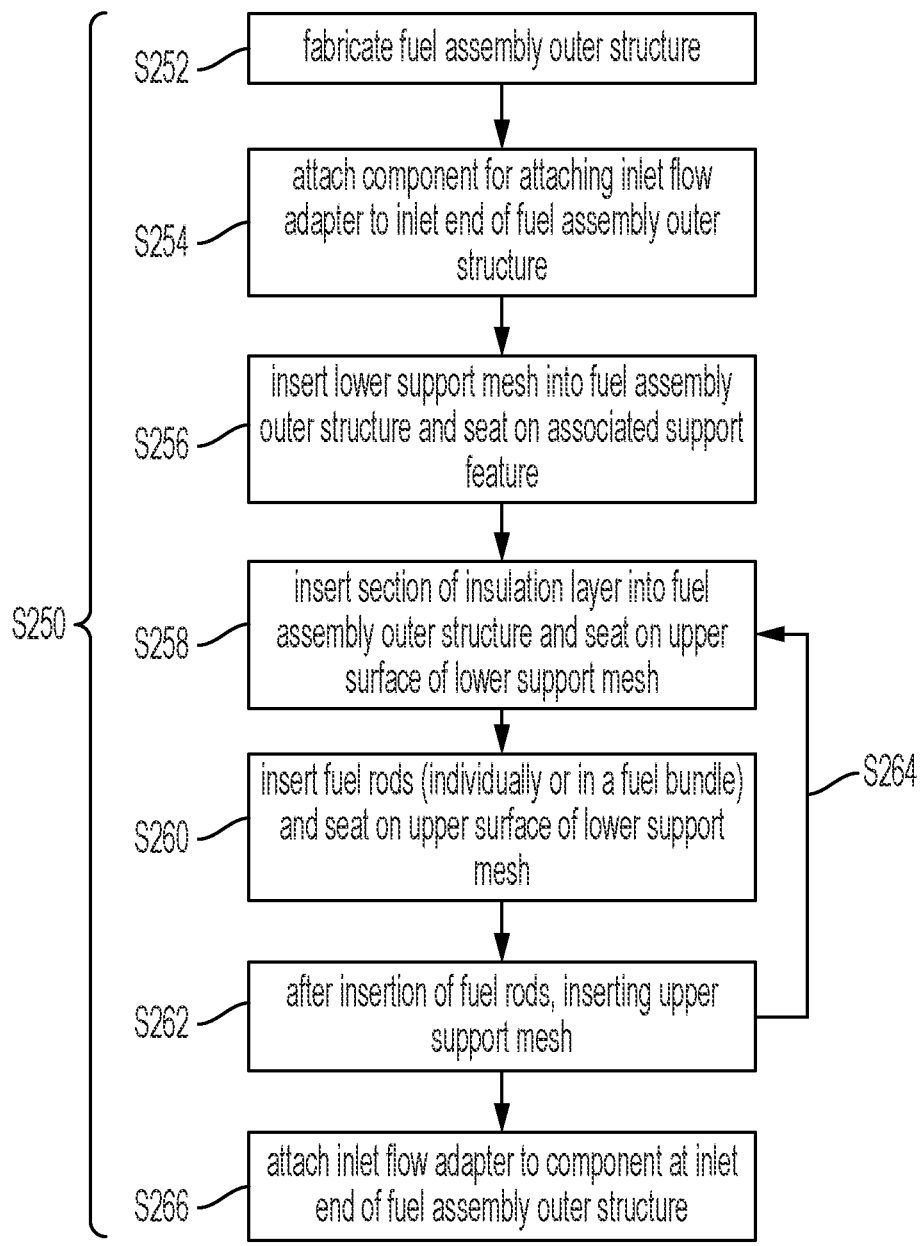
FIG. 7 is a flow chart of an example method of manufacturing a carbide-based fuel assembly.

The fuel assemblies 100 can be manufactured by suitable means. General steps in an example method S250 of manufacturing a carbide-based fuel assembly using fuel elements 105 in the form of elongated fuel bodies are shown in the flow chart in FIG. 7. In step S252, a fuel assembly outer structure 110, such as a SiC—SiC composite structure, is fabricated by a suitable means. To facilitate later attachment of the inlet flow adapter 120 to the inlet end of the fuel assembly outer structure 110, an attachment component (such as a flange or short pipe section or a sleeve), typically formed of a metal alloy, is S254 attached to the inlet end by, for example, vacuum brazing or other process that can produce an essentially leak-tight joint. The components internal to the fuel assembly outer structure 110 are then inserted in a suitable order to achieve the desired location of each component within the fuel assembly outer structure 110, as well as positioning relative to each other, i.e., radially inward or outward, longitudinally stacked or not.

Thus, in one aspect, a support mesh 150, such as a disc-shaped zirconium carbide and/or niobium carbide porous body which has been previously manufactured, is S256 inserted into the fuel assembly outer structure 110 and seated on an associated support feature toward the outlet end of the fuel assembly outer structure 110 such that the first inserted support mesh 150 is a lower support mesh (relative to others in the fuel assembly 100). An insulation body, such as a tubular zirconium carbide insulation body which has been previously manufactured, is S258 inserted into the fuel assembly outer structure 110 and seated on an upper surface, preferably the outer region 158, of the support mesh 150 to form the insulation layer 160. Fuel elements 105, either individually or rods pre-assembled into a fuel bundle, are S260 inserted into the fuel assembly outer structure 110 in the space defined by the inner surface of the insulation layer 160 and seated on an upper surface of the support mesh 150. After the fuel for a particular section has been positioned, a support mesh 150 is S262 inserted as an upper support mesh for that section. Additional insulation bodies forming the insulation layer 160, and fuel elements 105 (whether individually or as a fuel bundle), and support mesh 150 can be added for subsequent sections in a cyclic process S264. After inserting the final fuel elements 105 and the final support mesh 150 into the fuel assembly outer structure 110, the inlet flow adapter 120 is S266 attached to the inlet end of the fuel assembly outer structure 110 via the previously attached attachment component.

In embodiments in which multiple insulation layers are present, such as the stepped arrangement illustrated in FIG. 5B, then additional insulation layers 160 can be inserted into the fuel assembly outer structure 110 and positioned within the previously inserted insulation layer 160. In embodiments in which the insulation layer 160 is interposed between the outer edge of the support mesh 150 and the inner surface of the fuel assembly outer structure 110, such as the arrangement illustrated in FIG. 3A, the insulation body forming the insulation layer 160 will be inserted prior to insertion of the support mesh 150, i.e., the sequence of steps S256 and S258 will be switched, and both the lowermost insulation layer 160 and the lowermost support mesh 150 will be seated on an appropriate feature at the outlet end of the fuel assembly outer structure 110.

Alternative embodiments can replace separate insulation layers 160 for each section (S1, S2, . . . ) with a single continuous insulation component that forms an insulation layer 160 for the entire fuel assembly 100. Such a single continuous insulation layer 160 may be more suitable for embodiments with more than one insulation layer 160, in which case the single continuous insulation layer 160 may extend the entire longitudinal length of the fuel assembly as an outer insulation layer and separate insulation layers 160 may be placed in each section as an inner insulation layer (outer and inner being relative to the radial direction from the longitudinal axis 140). An example of an outer single continuous insulation layer 160 and an inner insulation layer place in each section is depicted in FIG. 5B.

In additional aspects, the spacing of the fuel elements 105 so as to form the desired flow volume 115 is by suitable means. In one example applicable to fuel elements 105 in the form of an elongated fuel body to be arranged in a fuel element bundle, each fuel element 105 is wrapped with a refractory metal "wire" that is compatible with the material of the fuel element 105 and stable at the reactor operating conditions. The wire can be wrapped around each fuel element 105 using a helical pattern, preferably having a wide pitch. When the fuel elements are assembled into a fuel element bundle, the wire wrap around each fuel element 105 will make limited contact with the wire wrap around adjacent fuel elements 105, creating a space around each fuel element 105 that is part of the flow volume 115 that permits flow of coolant during reactor operation. The wire wrap around the fuel elements 105 located at the perimeter of the fuel element bundle also contributes to space those fuel elements 105 from the insulation layer 160, and thereby also contributes to creating a space to permit coolant flow.

In another example, fuel elements 105 having regular (or irregular) polygonal cross-sectional shapes and with a helical protrusion, such as a "twisted-ribbon" rod design, can be used to create the flow volume 115. This method may optionally be combined with wire wrap to hold the fuel elements 105 together in the fuel bundle and to also create the flow volume 115.

In a further example, appropriately-sized blind holes on the surface(es) of the support mesh(es) 150 can be made. Inserting ends of the fuel elements 105 into the blind holes can restrain the fuel elements 105 in position. The blind holes can be created by suitable machining methods and the thickness of the support mesh may be increased to accommodate the blind holes. To ensure proper positioning of the fuel elements 105 during assembly, an assembly fixture can be optionally used to assist in fuel element 105 positioning and for ease in mating to the blind holes. The material of the assembly fixture can be removed by heating to relatively low temperatures.

All components discussed above are fabricated to required specifications, including meeting dimension tolerances. It is also noted that the above method S250 for manufacturing a carbide-based fuel assembly is applicable to, and can be extend to, other fuel forms, including solid carbide or cermet fuel bodies containing flow channels or cercer fuel bodies containing flow channels.

The carbide-based fuel assemblies disclosed herein can be incorporated into a nuclear fission reactor structure. In general, the carbide-based fuel assemblies are positioned within a block of moderator material used to thermalize fast neutrons. Nuclear control means such as rotating peripheral control drums can be used to control the reactivity of the core. The entire core is located within a pressure boundary connected to a converging-diverging nozzle.

Figure 8:
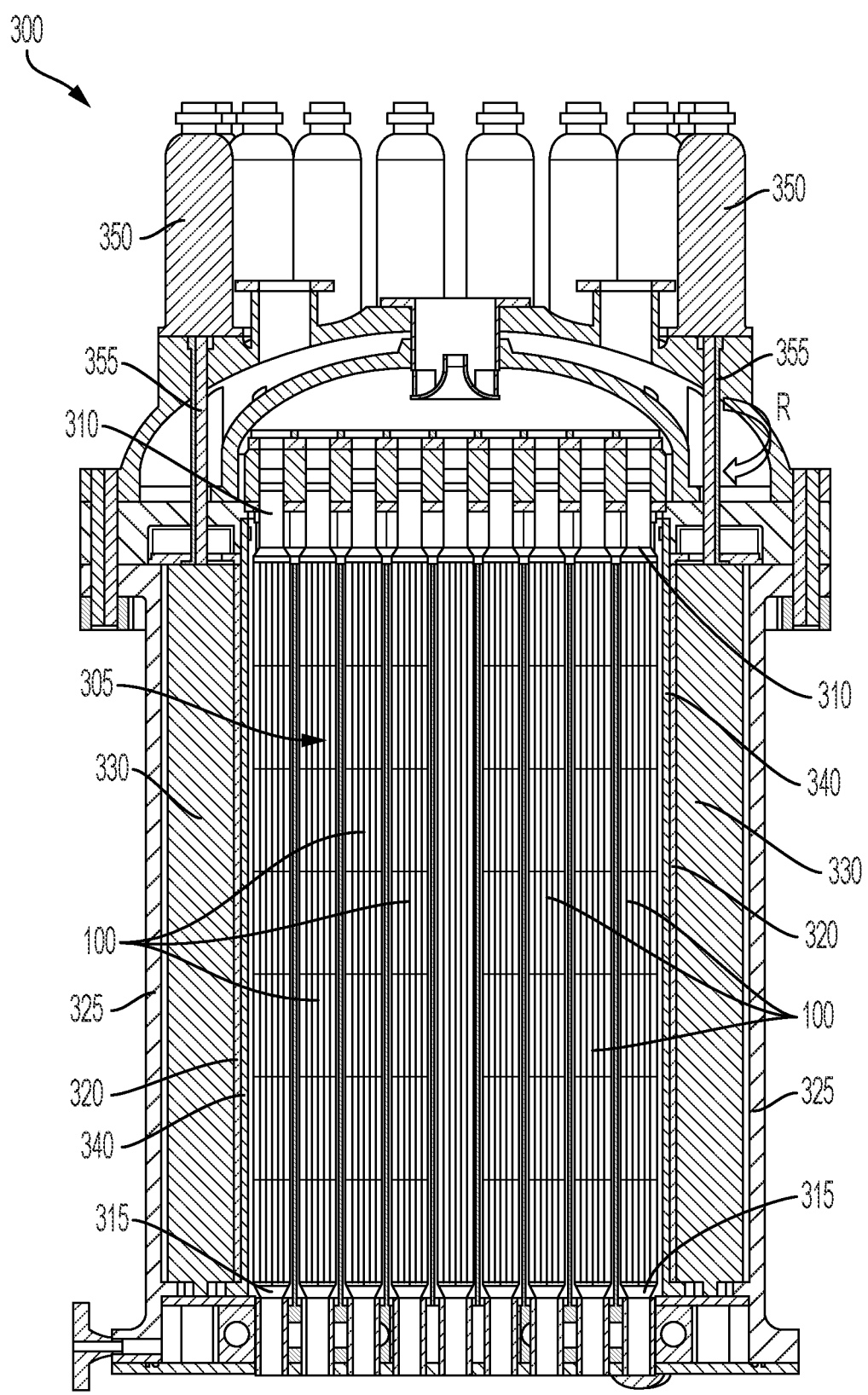
FIG. 8 is a schematic, cross-sectional, side view of an embodiment of a nuclear propulsion fission reactor structure within a vessel.

FIG. 8 schematically illustrates, in a cross-section parallel to the reactor axis, an embodiment of a nuclear fission reactor structure within a NTP reactor. Embodiments of the nuclear fission reactor structure 300 includes a plurality of carbide-based fuel assemblies 100 (for example, any one of the carbide-based fuel assembly embodiments disclosed herein) located within an active core region 305 of the nuclear fission reactor structure 300 (the active core region 305 being the internal region where the moderator block is located and the fuel assembly portions within the moderator block). At the inlet and the outlet of the fuel assemblies 100, connection assemblies (such as inlet connection assembly 310 and outlet connection assembly 315) provide fluid communication for propellant supplied to and exhausted from each of the carbide-based fuel assemblies 100. Thus, the inlet connection assemblies 310 connect to or interface with entrance openings 130 of the plurality of fuel assemblies 100 and the outlet connection assemblies 315 connect to or interface with exit openings 135 of the plurality of carbide-based fuel assemblies 100.

An interface structure 340, which may or may not include supplemental radial restraint, is radially outward of the active core region 305 and a reflector 320 is radially outward of the interface structure 340. A first surface of the interface structure 340 is conformal to the outer surface of the active core region 305 and a second surface of the interface structure 340 is conformal to an inner surface of the reflector 320. The inner surface of the reflector 320 is oriented toward the active core region 305, and the interface structure 340 functions to mate the geometry of the outer surface of the active core region 305 to the geometry of the inner surface of the reflector 320, thus allowing various arrangements for the carbide-based fuel assemblies 100 in the moderator block 210, such as a hexagonal pattern leading to a hexagonal interface with the interface structure 340 or a concentric ring pattern leading to a circular interface with the interface structure 340.

Figure 9:
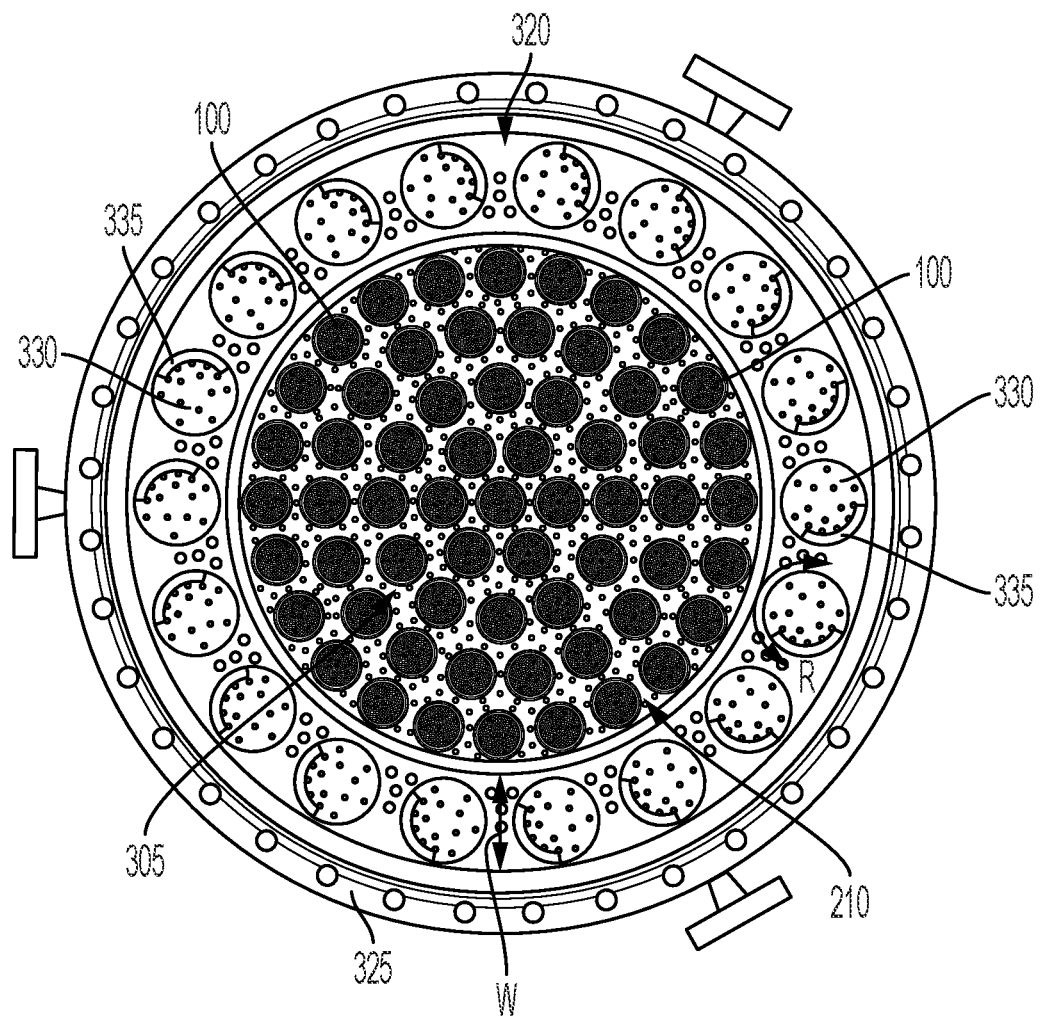
FIG. 9 is a schematic, cross-sectional, top view of an embodiment of an embodiment of a nuclear propulsion fission reactor structure within a vessel.

FIG. 9 is a schematic, cross-sectional, top view of an embodiment of an embodiment of a nuclear propulsion fission reactor structure 300 within a vessel 325. A plurality of control drums 330, each including a neutron absorber body 335, is located within a volume of the reflector 320, such as in an annular section on the outer portion of the cylindrically shaped control drum. The control drum 335 itself is made of a neutron reflecting material, similar to the reflector 320. The neutron absorber body 335 is made of a neutron absorbing material and is movable, such as by rotation, between a first position and a second position, the first position being radially closer to the active core region than the second position. In exemplary embodiments, the first position is radially closest to the active core region and the second position is radially farthest from the active core region. The neutron absorber body 335 is movable between the first position and the second position to control the reactivity of the active core region 305. In the illustrated example, the neutron absorber body 335 is rotatable from the first, radially closer position, to the second position by rotation (R) around an axis of the control drums 330. However, other radial positions and/or movement directions can be implemented as long as the various positions to which the neutron absorber body 335 can be moved provides control of the reactivity of the active core region 305. In some embodiments, when the plurality of neutron absorber bodies 335 are each at the first, radially closer position, each of the plurality of neutron absorber bodies 335 are radially equidistant from the axial centerline of the active core region 305. Other control concepts can also be implemented, such as regulating neutron leakage by opening and closing portions of the reflector 320.

The reflector 320 primarily functions to "reflect" neutrons back into the active core region to maintain criticality and reduces "leakage" of neutrons. Neutrons escaping from the reactor have no chance to generate fission reactions, lowering the criticality potential of the nuclear fission reactor structure. Secondarily, the reflector 320 houses the control drums 330 with the neutron absorber bodies 335, which are the primary system for reactivity control. In FIGS. 8 and 9, the embodiment of a reflector 320 is in the form of an annulus with rotatable control drums 330 including a section with a neutron absorber body 335. In order to house sufficiently sized rotatable control drums 330 with sufficiently sized neutron absorber bodies 335 to control reactivity, the annulus of the reflector 320 cannot be overly thin (in width (W) between an inner surface and an outer surface). In exemplary embodiments, the width (W) is 10 cm to 30 cm for a beryllium-based reflector. The width may vary based on the materials of the reflector 320 and, if applicable, the weight requirements for non-terrestrial applications of the nuclear fission reactor structure. Materials with lower neutron reflecting properties require a thicker reflector, i.e., a larger width (W).

The nuclear fission reactor structure can further comprise a vessel 325. FIGS. 8 and 9 schematically illustrate an embodiment of a nuclear fission reactor structure 300 with a vessel 325. The nuclear fission reactor structure 300, which includes the active core region 305, the interface structure 340, the inlet connection assembly 310 and outlet connection assembly 315, the reflector 320, and the plurality of control drums 330 with neutron absorber bodies 335, is housed within an interior volume of the vessel 325.

As shown in FIG. 8, motors 350 are operatively attached for rotation to the control drums 330 by a drum shaft 355. Motors 350 may be housed in pressure boundary extensions of the vessel 325 or alternatively may not be, in which case seals are required around the drum shafts 355. Motors internal to the vessel 325 can also be implemented.

Embodiments of the vessel 325 are formed from machined forgings and generally use high strength aluminum or titanium alloys due to weight considerations. The vessel 325 can be multiple components that are then assembled together, for example, with fasteners. However, in other embodiments, the vessel 325 can be one contiguous component or a welded together assemblage.

Additional disclosure related to the nuclear fission reactor structure and its components can be found in U.S. patent application Ser. No. 16/999,244, the entire contents of which are incorporated by reference.

The disclosure is also directed to a nuclear thermal propulsion engine that includes the nuclear fission reactor structure 300 within a vessel 325. The nuclear thermal propulsion engine further includes shielding, turbo machinery, and a nozzle section attached to or supported by the vessel 325, for example, as consistent with that shown and described in connection with FIG. 1.

It is contemplated that various supporting and ancillary equipment can be incorporated into the disclosed nuclear fission reactor structure and nuclear thermal propulsion engine. For example, at least one of a moderator (such as a zirconium hydride, beryllium, beryllium oxide, and graphite), a control rod for launch safety, a neutron source to assist with start-up, and a scientific instrument (such as a temperature sensor or radiation detector) can be incorporated into the nuclear propulsion fission reactor structure.

The disclosed arrangements pertain to any configuration in which a heat generating source including a fissionable nuclear fuel composition, whether a fuel element or a plurality of fuel elements, is incorporated into a fuel assembly. Although generally described herein in connection with a gas-cooled nuclear thermal propulsion reactors (NTP reactors), the structures and methods disclosed herein can also be applicable to other fission reactor systems.

Nuclear propulsion fission reactor structure disclosed herein can be used in suitable applications including, but not limited to, non-terrestrial power applications, space power, space propulsion, and naval applications, including submersibles.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A fuel assembly, comprising:
    a fuel assembly outer structure formed of a ceramic matrix composite material;
    a first fuel element and a second fuel element contained within the fuel assembly outer structure;
    an insulation layer formed of a first refractory ceramic material, wherein the insulation layer is interposed between an inner surface of the fuel assembly outer structure and an outer envelope surface of the first fuel element, and wherein the insulation layer is spaced apart from the outer envelope surface of the first fuel element and extends parallel to the first fuel element from a first end surface of the first fuel element to a second end surface of the first fuel element; and
    a first support mesh located at the first end surface of the first fuel element and a second support mesh located at the second end surface of the first fuel element,
    wherein the second fuel element is separated from the first fuel element in a longitudinal direction by one of the first support mesh and the second support mesh,
    wherein each of the first support mesh and the second support mesh includes a first region having a plurality of openings, and
    wherein the plurality of openings are interconnected internally within the first region and form a flow path from a first side to a second side of the respective support mesh.

2. The fuel assembly according to claim 1, wherein each of the first fuel element and the second fuel element includes a plurality of elongated fuel bodies,
    wherein each elongated fuel body contains a fuel composition, and
    wherein the plurality of elongated fuel bodies are arranged in a fuel bundle.

3. The fuel assembly according to claim 2, wherein each elongated fuel body longitudinally extends from a first end to a second end along a longitudinal axis of the respective elongated fuel body,
    wherein, in the fuel bundle, the plurality of elongated fuel bodies are arranged in spaced-apart relationship relative to each other, and
    wherein an empty space between the spaced-apart elongated fuel bodies in the fuel bundle is a coolant flow volume through which a coolant in a form of a propellant gas flows during operation of a reactor containing the fuel assembly.

4. The fuel assembly according to claim 2, wherein the fuel assembly is elongated and is tubular-shaped and has an axial centerline defining a longitudinal axis of the fuel assembly,
    wherein the plurality of elongated fuel bodies of the first fuel element are located at positions that are axisymmetric about the longitudinal axis of the fuel assembly, as seen in cross-section in a plane perpendicular to the longitudinal axis of the fuel assembly.

5. The fuel assembly according to claim 4, wherein, in a plane perpendicular to the longitudinal axis of the elongated fuel body, a cross-sectional shape of the elongated fuel body is a polygon, a circle, or an oval, preferably a regular polygon.

6. The fuel assembly according to claim 2, wherein the fuel composition includes a high-assay low-enriched uranium.

7. The fuel assembly according to claim 6, wherein the fuel composition includes uranium having a U-235 assay above 5 percent and below 20 percent.

8. The fuel assembly according to claim 2, wherein the fuel composition includes a binary carbide containing uranium or a ternary carbide containing uranium.

9. The fuel assembly according to claim 8, wherein the first fuel element is refractory carbide coated.

10. The fuel assembly according to claim 2, wherein the fuel composition includes UC—ZrC.

11. The fuel assembly according to claim 2, wherein the fuel composition includes UC—ZrC—NbC.

12. The fuel assembly according to claim 2, wherein the fuel composition is carbide-based and wherein the first fuel element is refractory carbide coated.

13. The fuel assembly according to claim 1, wherein each of the first fuel element and the second fuel element includes one or more fuel monolith bodies,
   wherein each fuel monolith body contains a fuel composition, and wherein each fuel monolith body includes one or more coolant flow channels, and
   wherein the one or more coolant flow channels is a coolant flow volume through which a coolant in a form of a propellant gas flows during operation of a reactor containing the fuel assembly.

14. The fuel assembly according to claim 13, wherein the one or more fuel monolith bodies are in a form of a wafer, a layer, a pie-shaped section, or a cylinder.

15. The fuel assembly according to claim 13, wherein each fuel monolith body includes a carbide matrix in which the fuel composition is distributed.

16. The fuel assembly according to claim 15, wherein the fuel composition includes a binary carbide containing uranium or uranium nitride.

17. The fuel assembly according to claim 13, wherein each fuel monolith body includes a refractory metal matrix in which the fuel composition is distributed.

18. The fuel assembly according to claim 17, wherein the fuel composition includes uranium nitride.

19. The fuel assembly according to claim 17, wherein each fuel monolith body is refractory metal coated.

20. The fuel assembly according to claim 1, wherein the ceramic matrix composite material is a SiC—SiC composite.

21. The fuel assembly according to claim 1, wherein the first refractory ceramic material is porous with 60 to 85% of the volume consisting of void spaces.

22. The fuel assembly according to claim 1, wherein the first refractory ceramic material is 90% to 99.999% zirconium carbide having an open-cell foam structure or is 95% to 99.999% fibrous zirconium carbide.

23. The fuel assembly according to claim 1, wherein each of the first support mesh and the second support mesh includes an outer region enclosing a perimeter of the first region.

24. The fuel assembly according to claim 23, wherein the outer region has a lower porosity than the first region.

25. The fuel assembly according to claim 23, wherein the outer region is devoid of openings.

26. The fuel assembly according to claim 1, wherein the first refractory ceramic material is a first zirconium carbide refractory ceramic material,
   wherein each of the first support mesh and the second support mesh is formed of a second refractory ceramic material, and
   wherein the second refractory ceramic material is a second zirconium carbide refractory ceramic material or a niobium carbide refractory ceramic material.

27. The fuel assembly according to claim 26, wherein the second refractory ceramic material is porous with 30 to 70% of the volume consisting of void spaces.

28. The fuel assembly according to claim 26, wherein the second refractory ceramic material is 90% to 99.999% zirconium carbide or 90% to 99.999% niobium carbide, and wherein the second refractory ceramic material has an open-cell foam structure.

29. The fuel assembly according to claim 1, wherein a first end surface of the insulation layer abuts an outer region of the first support mesh and a second end surface of the insulation layer abuts an outer region of the second support mesh.

30. The fuel assembly according to claim 1, further comprising a third support mesh, wherein the third support mesh is located at an opposite end of the second fuel element from the one first or second support mesh separating the second fuel element from the first fuel element.

31. The fuel assembly according to claim 1, wherein the insulation layer interposed between the inner surface of the fuel assembly outer structure and the first fuel element is a first insulation layer and the first insulation layer extends longitudinally to also extend between the inner surface of the fuel assembly outer structure and the second fuel element, and
   the fuel assembly further comprises a second insulation layer, wherein the second insulation layer is interposed between an inner surface of the first insulation layer and the second fuel element.

32. The fuel assembly according to claim 31, wherein a first end surface of the second insulation layer abuts an outer region of the second support mesh and a second end surface of the second insulation layer abuts an outer region of the third support mesh.

33. The fuel assembly according to claim 1, wherein the insulation layer interposed between the inner surface of the fuel assembly outer structure and the first fuel element is a first insulation layer,
   wherein an insulation layer interposed between the inner surface of the fuel assembly outer structure and the second fuel element is a second insulation layer, and
   wherein the first insulation layer is longitudinally separated from the second insulation layer by the one first or second support mesh separating the second fuel element from the first fuel element.

34. The fuel assembly according to claim 1, wherein the insulation layer interposed between the inner surface of the fuel assembly outer structure and the first fuel element extends an entire length of the fuel assembly outer structure.

35. The fuel assembly according to claim 1, further comprising an inlet flow adapter at a first end of the fuel assembly and an outlet flow adapter at a second end of the fuel assembly, wherein the fuel assembly outer structure connects the inlet flow adapter to the outlet flow adapter.

36. A nuclear fission reactor structure, comprising:
   a moderator block including a plurality of fuel assembly openings;
   a plurality of fuel assemblies according to claim 35, each of the plurality of fuel assemblies located in a different one of the plurality of fuel assembly openings,
   an inlet connection assembly; and
   an outlet connection assembly,
   wherein, in a cross-section of the moderator block perpendicular to a longitudinal axis of the nuclear fission reactor structure, the plurality of fuel assemblies are distributively arranged in the moderator block, wherein the inlet connection assembly includes an inlet plenum connecting entrance openings of the plurality of fuel assemblies, and wherein the outlet connection assembly includes an outlet plenum connecting exit openings of the plurality of fuel assemblies.

37. The nuclear fission reactor structure according to claim 36, further comprising:

a plurality of moderator block coolant channels, wherein the moderator block coolant channels extend in a longitudinal direction relative to the longitudinal axis of the nuclear fission reactor structure from a first end surface of the moderator block to a second end surface of the moderator block, and wherein the plurality of moderator block coolant channels are in spaced-apart relation to, and distributed about, a periphery of each of the plurality of fuel assembly openings.

38. The nuclear fission reactor structure according to claim 37, further comprising a gas gap between an inner surface of the fuel assembly openings and an outer surface of the fuel assembly outer structure.

39. The nuclear fission reactor structure according to claim 36, wherein the moderator block has a composition including zirconium hydride, beryllium, beryllium oxide, yttrium hydride, graphite or combinations thereof.

40. A nuclear thermal propulsion engine, comprising:

the nuclear fission reactor structure according to claim 36;

shielding;

a reservoir for cryogenically storing a propulsion gas;

turbomachinery; and a nozzle, wherein the nozzle is operatively mounted to the outlet connection assembly, and wherein the nozzle provides a flow path for heated propulsion gas exiting the nuclear fission reactor structure.

41. A nuclear fission reactor structure, comprising:

a moderator block including a plurality of fuel assembly openings; and a plurality of fuel assemblies according to claim 1, each of the plurality of fuel assemblies located in a different one of the plurality of fuel assembly openings, wherein, in a cross-section of the moderator block perpendicular to a longitudinal axis of the nuclear fission reactor structure, the plurality of fuel assemblies are distributively arranged in the moderator block.

42. The nuclear fission reactor structure according to claim 41, further comprising:

a plurality of moderator block coolant channels, wherein the moderator block coolant channels extend in a longitudinal direction relative to the longitudinal axis of the nuclear fission reactor structure from a first end surface of the moderator block to a second end surface of the moderator block, and wherein the plurality of moderator block coolant channels are in spaced-apart relation to, and distributed about, a periphery of each of the plurality of fuel assembly openings.

43. The nuclear fission reactor structure according to claim 42, further comprising a gas gap between an inner surface of the fuel assembly openings and an outer surface of the fuel assembly outer structure.

44. The nuclear fission reactor structure according to claim 41, wherein the moderator block has a composition including zirconium hydride, beryllium, beryllium oxide, yttrium hydride, graphite or combinations thereof.

* * * * *